(12) United States Patent
Matsuzaki et al.

(10) Patent No.: US 9,694,679 B2
(45) Date of Patent: Jul. 4, 2017

(54) DRIVE CONTROL SYSTEM FOR WORK VEHICLE

(71) Applicant: Kubota Corporation, Osaka (JP)

(72) Inventors: Akihiro Matsuzaki, Osaka (JP);
Satoshi Yoshikawa, Osaka (JP);
Michita Kono, Osaka (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 14/796,262

(22) Filed: Jul. 10, 2015

(65) Prior Publication Data

US 2016/0001655 A1    Jan. 7, 2016

Related U.S. Application Data

(63) Continuation of application No. 14/024,366, filed on Sep. 11, 2013, now Pat. No. 9,096,127.

(30) Foreign Application Priority Data

Nov. 7, 2012  (JP) ................................. 2012-245597
Nov. 7, 2012  (JP) ................................. 2012-245598

(51) Int. Cl.
*B60K 23/08*     (2006.01)
*B60K 28/16*     (2006.01)
*B60W 10/06*    (2006.01)

(52) U.S. Cl.
CPC ............ *B60K 23/08* (2013.01); *B60K 28/165* (2013.01); *B60W 10/06* (2013.01); *B60K 28/16* (2013.01);

(Continued)

(58) Field of Classification Search
CPC ......................... B60K 23/08; B60K 2023/085
(Continued)

(56) References Cited

U.S. PATENT DOCUMENTS 6,109,384 A    8/2000  Bromley et al.
6,419,040 B2   7/2002  Kitano et al.
(Continued)

FOREIGN PATENT DOCUMENTS

EP    0864482 A2    9/1998
EP    1110785 A2    6/2001
(Continued)

*Primary Examiner* — Redhwan k Mawari
*Assistant Examiner* — Anshul Sood
(74) *Attorney, Agent, or Firm* — The Webb Law Firm

(57) ABSTRACT

A drive control system for a work vehicle is provided with a power transmission device that drives front wheels and rear wheels, a request determination unit, and a drive mode control unit. The power transmission device has a drive mode switching mechanism that performs drive mode switching between a four-wheel drive mode in which drive power is transmitted to front wheels and rear wheels and a two-wheel drive mode in which drive power is transmitted to only the rear wheels. The request determination unit determines a necessity for an increase in drive power on a contact area of the work vehicle, and outputs an increase request based on the determination result. The drive mode control unit outputs a drive mode switching request for switching to the four-wheel drive mode to the drive mode switching mechanism, in response to output of the increase request.

11 Claims, 9 Drawing Sheets

(52) U.S. Cl.
CPC . *B60K 2023/0858* (2013.01); *B60Y 2200/221* (2013.01); *B60Y 2300/181* (2013.01); *B60Y 2300/18175* (2013.01)

(58) Field of Classification Search
USPC ..................................................... 701/60, 69
See application file for complete search history.

(56) References Cited

U.S. PATENT DOCUMENTS

| | | | |
|---|---|---|---|
| 8,068,946 | B2 | 11/2011 | Amamiya |
| 2001/0005704 | A1 | 6/2001 | Kitano et al. |
| 2002/0046893 | A1* | 4/2002 | Handa .................... B60K 23/06 180/247 |
| 2009/0057047 | A1 | 3/2009 | Beechie et al. |
| 2012/0239260 | A1 | 9/2012 | Ishikawa et al. |

FOREIGN PATENT DOCUMENTS

| | | | |
|---|---|---|---|
| JP | 5963022 | U | 4/1984 |
| JP | 6177527 | A | 4/1986 |
| JP | 61207218 | A | 9/1986 |
| JP | 10114229 | A | 5/1998 |
| JP | 11189059 | A | 7/1999 |
| JP | 11192849 | A | 7/1999 |
| JP | 11342761 | A | 12/1999 |
| JP | 200062494 | A | 2/2000 |
| JP | 200195341 | A | 4/2001 |
| JP | 2004306956 | A | 11/2004 |
| JP | 2011239755 | A | 12/2011 |

* cited by examiner

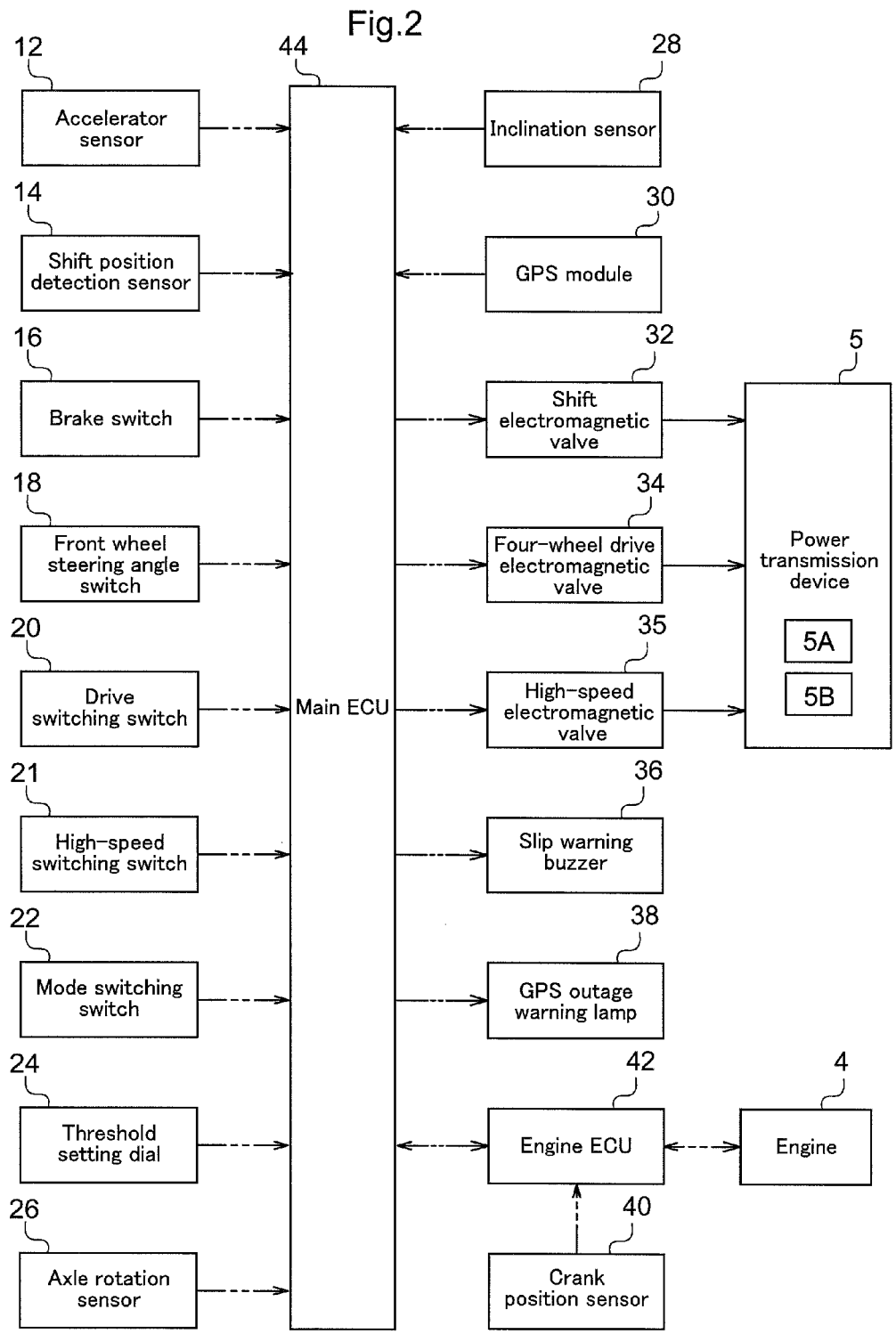

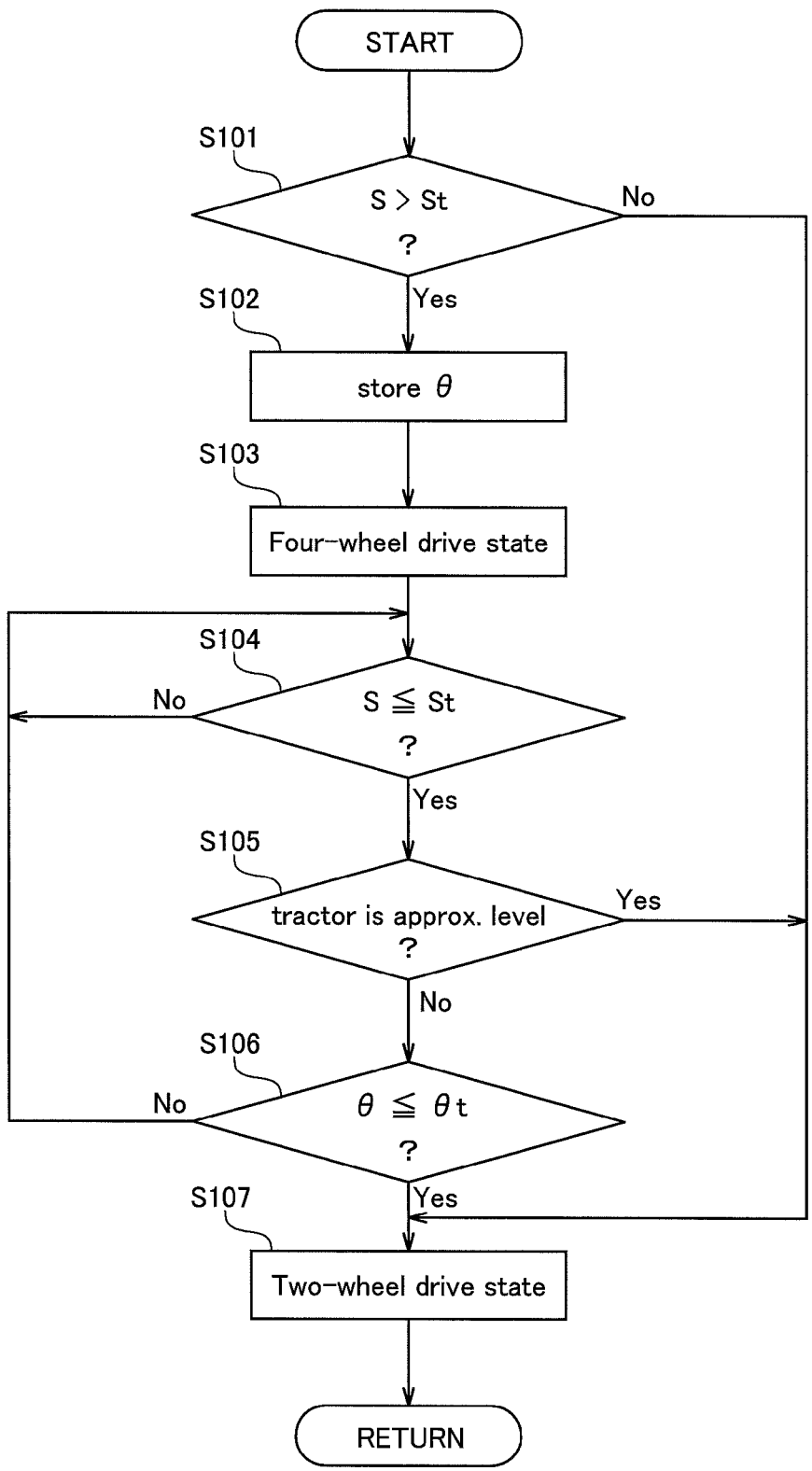

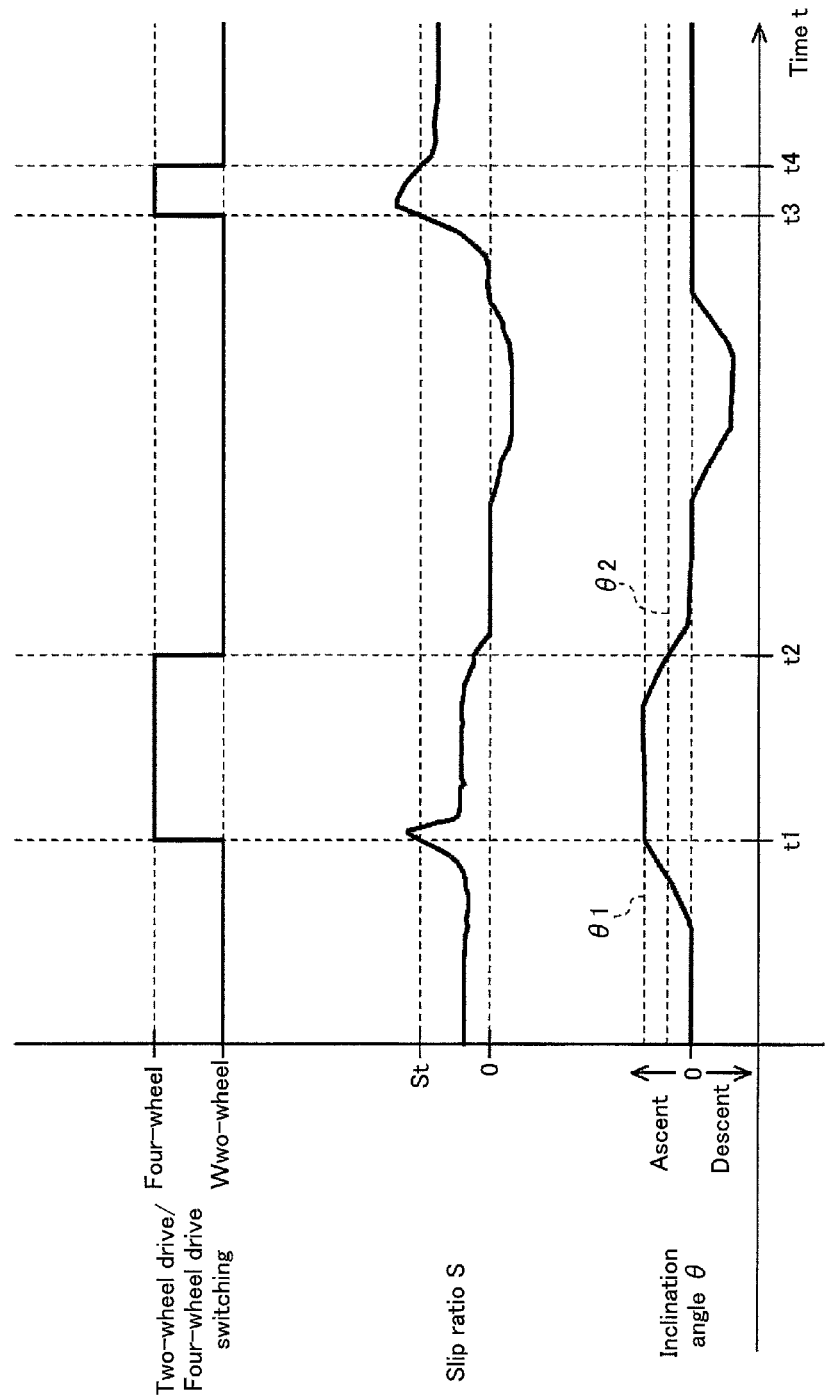

DRIVE CONTROL SYSTEM FOR WORK VEHICLE

CROSS-REFERENCE TO RELATED APPLICATIONS

This application is a continuation of U.S. application Ser. No. 14/024,366, filed on Sep. 11, 2013, which claims priority to Japanese Patent Application Nos. 2012-245597 and 2012-245598, both filed on Nov. 7, 2012, all of which are hereby incorporated by reference in their entireties.

BACKGROUND OF THE INVENTION

1. Field of the Invention

The present invention relates to work vehicles, and more particularly to a drive control system for a work vehicle provided with a power transmission device having a drive mode switching mechanism that performs drive mode switching between a four-wheel drive mode in which drive power is transmitted to front and rear wheels, and a two-wheel drive mode in which drive power is transmitted to only the rear wheels.

2. Description of the Related Art

A drive control system for a work vehicle that automatically switches the work vehicle from the two-wheel drive mode to the four-wheel drive mode depending on the situation is known from JP 10-114229A.

With the vehicle disclosed in JP 10-114229A, as a result of the drive mode being automatically switched from the two-wheel drive mode to the four-wheel drive mode when a slip ratio calculated from the rotation speed of the left and right rear wheels is greater than or equal to a predetermined value, slippage of the vehicle is eliminated (the slip ratio is improved) and drive power (fraction) on the contact area of the vehicle is increased.

However, with this work vehicle, the drive mode is first switched from the two-wheel drive mode to the four-wheel drive mode when a certain degree of slippage has occurred, making it difficult to increase the drive power on the contact area quickly.

Furthermore, because the drive control system does not take the inclination of the body of the work vehicle (inclination of the contact area) into consideration, problems such as the following occur.

For example, assume that slippage occurs when the work vehicle is going up a slope in the two-wheel drive mode (the work vehicle is inclined). In this case, the work vehicle is automatically driven in the four-wheel drive mode when the slip ratio is greater than or equal to a predetermined value, enabling the slippage to be eliminated. Once the slippage is eliminated, the work vehicle again returns to the two-wheel drive mode. However, since the work vehicle is still going up the slope, the work vehicle again slips and is automatically switched to the four-wheel drive mode. In other words, in the case where slippage occurs when the work vehicle is inclined, a situation could possibly arise where the work vehicle is endlessly switched alternately between the two-wheel drive mode and the four-wheel drive mode (hunting state).

In view of this situation, there is also demand for a drive control system for a work vehicle that is able to appropriately eliminate slippage even when the work vehicle is inclined and/or a drive control system in which drive power is quickly increased under circumstances where it is desirable to increase drive power on the contact area of the work vehicle.

SUMMARY OF THE INVENTION

In order to resolve the above problems, one drive control system for a work vehicle according to the present invention includes a power transmission device having a drive mode switching mechanism that performs drive mode switching between a four-wheel drive mode in which drive power is transmitted to front wheels and rear wheels and a two-wheel drive mode in which drive power is transmitted to only the rear wheels; a slip ratio detection unit that detects a slip ratio with respect to a contact area of wheels that are being driven; an inclination angle detection unit that detects an inclination angle in a front-back direction of the work vehicle; and a drive mode control unit that outputs a drive mode switching request to the drive mode switching mechanism based on the slip ratio detected by the slip ratio detection unit and the inclination angle detected by the inclination angle detection unit. Furthermore, a drive mode switching request for switching to the four-wheel drive mode is output in a case where a slip ratio exceeding a threshold set in advance is detected, and a drive mode switching request for switching to the two-wheel drive mode is output in a case where a reduction in the slip ratio and a reduction in the inclination angle are detected.

According to this configuration, not only the slip ratio but also the inclination angle in the front-back direction of the work vehicle serves as a condition parameter for switching the drive mode, enabling slippage to be appropriately eliminated, even in the case where the work vehicle is inclined.

In one preferred embodiment of the present invention, when the inclination angle detected at the time of outputting the drive mode switching request output for switching to the four-wheel drive mode decreases by a predetermined percentage, a drive mode switching request for switching from the four-wheel drive mode to the two-wheel drive mode is output. With this configuration, returning from the four-wheel drive mode to the two-wheel drive mode is conditional on a decrease in the inclination angle based on the inclination angle detected at the time that the slip ratio exceeded a threshold, enabling slippage to be eliminated more appropriately.

In one preferred embodiment of the present invention, in a case where the slip ratio decreases to less than or equal to the threshold and the work vehicle is approximately level, a drive mode switching request for switching from the four-wheel drive mode to the two-wheel drive mode is output. With this configuration, the inclination angle of the work vehicle has virtually no influence on slippage when the work vehicle is substantially level. Because the drive mode returns to the two-wheel drive mode based only on the slip ratio irrespective of the inclination angle, more effective elimination of slippage is realized.

As a preferred embodiment, if a threshold changing unit configured to arbitrarily change the threshold is provided, appropriate elimination of slippage in response to factors such as the state of the contact area and the type of work is realized, through proper adjustment of the threshold.

In one preferred embodiment of the present invention, the slip ratio detection unit calculates the slip ratio from an actual traveling speed of the work vehicle calculated based on position information from a GPS module that detects a position of the work vehicle, and a theoretical traveling speed calculated based on a drive speed of the power transmission device. With this configuration, because the actual vehicle speed (actual traveling speed) is calculated using GPS, an accurate slip ratio is obtained. Given that GPS modules are used with car navigation systems and the like, in the case where a GPS module is already installed, the installed GPS module can be conveniently used, without particularly needing to provide a speedometer for deriving the actual traveling speed. In addition, because high accuracy GPS modules are installed in tractors used for precision agriculture (tractors provided with implements, etc., that operate using a GPS function), a very accurate slip ratio is obtained.

In order to resolve to above problems, another drive control system for a work vehicle according to the present invention includes a power transmission device having a drive mode switching mechanism that performs drive mode switching between a four-wheel drive mode in which drive power is transmitted to front wheels and rear wheels and a two-wheel drive mode in which drive power is transmitted to only the rear wheels; a request determination unit that determines a necessity for an increase in drive power on a contact area of the work vehicle, and outputs an increase request based on the determination result; and a drive mode control unit that outputs a drive mode switching request for switching to the four-wheel drive mode to the drive mode switching mechanism in response to output of the increase request.

With this configuration, an increase in the drive power of the work vehicle by means such as suppression of the occurrence of slippage of the work vehicle is quickly realized under circumstances where it is desirable to increase drive power on the contact area of the work vehicle.

In one preferred embodiment of the present invention, a start detection unit that detects that the work vehicle has started traveling is provided, and the request determination unit outputs the increase request in response to the start detection unit detecting that the work vehicle has started traveling. With this configuration, the occurrence of slippage of the work vehicle immediately after the work vehicle has started traveling is suppressed.

Similarly, in one preferred embodiment of the present invention, a shift operation detection unit that detects a shift operation event of the power transmission device is provided, and the request determination unit outputs the increase request in response to the shift operation detection unit detecting the shift operation event. With this configuration, the occurrence of slippage of the work vehicle that can occur at the time of an operation for shifting the power transmission device of the work vehicle is suppressed.

In one preferred embodiment of the present invention, an engine revs change detection unit that detects a target revs change event with respect to an engine of the work vehicle is provided, and the request determination unit outputs the increase request in response to the engine revs change detection unit detecting the target revs change event. With this configuration, the occurrence of slippage of the work vehicle when an operation for changing the target number of revolutions of the engine of the work vehicle has been performed is suppressed.

In one preferred embodiment of the present invention, a target revs detection unit that detects a target number of revolutions of an engine of the work vehicle, and an actual revs detection unit that detects an actual number of revolutions of the engine are provided, and the request determination unit outputs the increase request when the actual number of revolutions of the engine is greater than the target number of revolutions by a predetermined value or more.

With this configuration, it is possible to increase the drive power of the work vehicle when the actual number of revolutions of the engine is greater than the target number of revolutions by a predetermined value or more (so-called engine coasting (the engine is being driven by the wheels)).

In one preferred embodiment of the present invention, a steering angle detection unit that detects an over-steering angle at which a steering angle of the front wheels formed as steering wheels is greater than or equal to a predetermined value, and a high-speed detection unit that detects a high-speed drive state in which the front wheels are rotated at a faster ground speed than the rear wheels are provided, and a second increase request requesting transition to the high-speed drive state is output in priority to the increase request when the over-steering angle is detected. With this configuration, turning can be facilitated and damage to the contact area is suppressed, by preferentially switching the work vehicle to the high-speed drive state in the case where the steering angle of the front wheels is greater than or equal to a predetermined value.

BRIEF DESCRIPTION OF THE DRAWINGS

FIG. 2 is a block diagram showing the configuration of the drive control system.

FIG. 3 is a flowchart showing a first control aspect.

FIG. 4 is a time chart showing a specific example of the first control aspect.

DETAILED DESCRIPTION OF PREFERRED EMBODIMENTS

Figure 1:
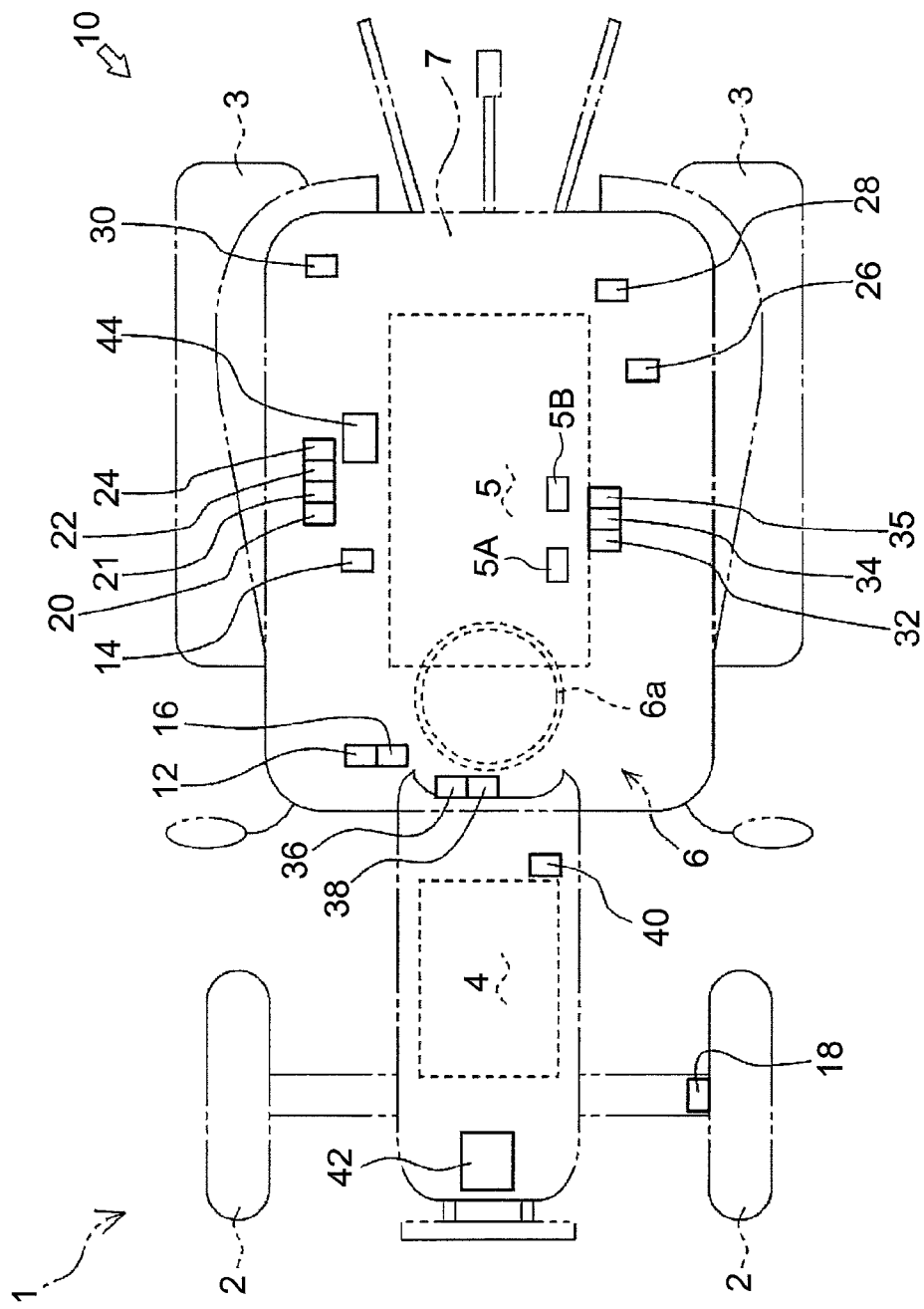
FIG. 1 is a plane schematic view showing the configuration of a tractor and a drive control system.
Figure 5A:
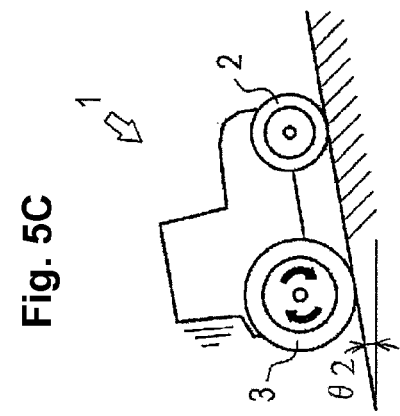
FIGS. 5A to 5F are side schematic views showing the tractor in the first control aspect.
Figure 5B:
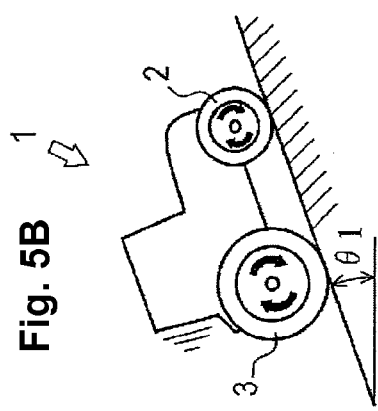
Figure 5C:
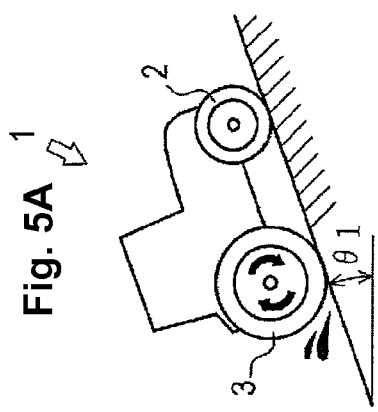
Figure 5D:
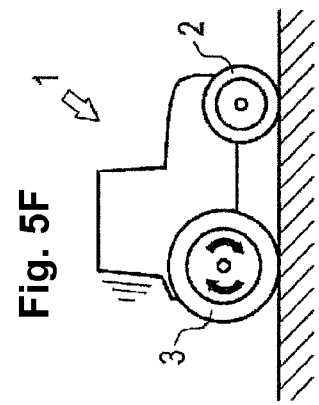
Figure 5E:
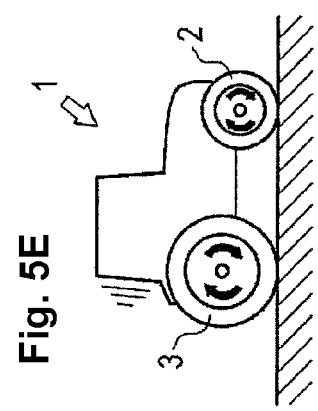
Figure 5F:
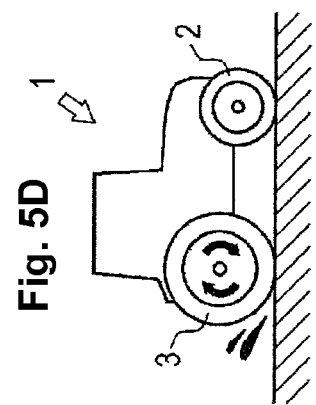

Hereinafter, an example of a drive control system for a work vehicle according to the present invention will be described with reference to the drawings. In FIG. 1, a tractor 1 serving as a work vehicle in which a drive control system 10 has been installed is shown. Note that although the tractor 1 is given as a work vehicle in the present embodiment, the present invention is not limited thereto. Work vehicles in which the drive control system 10 according to the present invention may be installed include agricultural vehicles other than a tractor, construction vehicles, industrial vehicles and the like.

The tractor 1 is provided with front wheels 2, rear wheels 3, an engine 4, a power transmission device 5, an operation portion 6, and a cabin 7. The front portion of a body of the tractor 1 is supported by a pair of left and right wheels (front wheels 2) via a front axle. The rear portion of the body is supported by a pair of left and right wheels (rear wheels 3) via a rear axle. The engine 4 is provided in the front portion of the body. The power transmission device 5 (transmission) which has a shift function (normally realized by a continuously variable transmission and/or a geared transmission) is provided in the rear portion of the body.

Power from the engine 4 is transmitted to the front wheels 2 through the front axle and to the rear wheels 3 through the rear axle, after the power transmission device 5 has been shifted. The front wheels 2 and the rear wheels 3 are rotationally driven by the power from the engine 4, causing the tractor 1 to travel.

The operation portion 6 where the operator rides and operates the tractor 1 is provided from a mid portion in the front-back direction to the rear portion of the body of the tractor 1. A steering wheel 6A for the operator to steer the tractor 1, a seat (not shown), and the like are provided in the operation portion 6. The operation portion 6 is covered by the cabin 7.

The constituent elements of the drive control system 10 are disposed in various portions of the tractor 1. Hereinafter, the configuration of the drive control system 10 will be described, with reference to FIGS. 1 and 2. One constituent element that is controlled by the drive control system 10 is a drive mode switching mechanism 5A that appropriately switches the tractor 1 to a two-wheel drive mode (state where only the rear wheels 3 are rotationally driven) or a four-wheel drive mode (state where the front wheels 2 and the rear wheels 3 are rotationally driven).

The main element of the drive control system 10 is a main ECU 44, with the other constituent elements including an accelerator sensor 12, a shift position detection sensor 14, a brake switch 16, a front wheel steering angle switch 18, a drive switching switch 20, a high-speed switching switch 21, a mode switching switch 22, a threshold setting dial 24, an axle rotation sensor 26, an inclination sensor 28, a shift electromagnetic valve 32, a four-wheel drive electromagnetic valve 34, a high-speed electromagnetic valve 35, a slip warning buzzer 36, a GPS outage warning lamp 38, a crank position sensor 40, a GPS module 30, and an engine ECU 42.

The accelerator sensor 12 detects the operating position of an accelerator operating tool (accelerator pedal, accelerator lever, etc.) for performing an operation for changing the target value of the number of revolutions (target number of revolutions) of the engine 4. The accelerator operating tool is provided in a position that enables operation by the operator of the operation portion 6. The accelerator sensor 12 is provided in a position (e.g., turning base end portion of the accelerator operating tool) that enables the operating position of the accelerator operating tool to be detected. Note that in the case where a plurality of accelerator operating tools are provided, a plurality of accelerator sensors 12 are provided corresponding respectively to the plurality of accelerator operating tools.

In the present embodiment, the accelerator sensor 12 is used for state detection performed in the main ECU 44, such as detection of engine operation or detection of the target number of revolutions, for example.

The shift position detection sensor 14 detects the operating position of a shift operating tool (main shift lever, auxiliary shift lever, etc.) for performing an operation for shifting the power transmission device 5. The shift operating tool is provided in a position that enables operation by the operator of the operation portion 6. The shift position detection sensor 14 is provided in a position (e.g., turning base end portion of the shift operating tool) that enables the operating position of the shift operating tool to be detected. Note that in the case where a plurality of shift operating tools are provided, a plurality of shift position detection sensors 14 are provided corresponding respectively to the plurality of shift operating tools.

In the present embodiment, the shift position detection sensor 14 is used for state detection and shift operation detection performed in the main ECU 44.

The brake switch 16 detects whether a brake operating tool (brake pedal, parking brake lever, etc.) for braking the tractor 1 has been operated. The brake operating tool is provided in a position that enables operation by the operator of the operation portion 6. The brake switch 16 is provided in a position (e.g., turning base end portion of the brake operating tool) that enables detection of whether the brake operating tool has been operated. Note that in the case where a plurality of brake operating tools are provided, a plurality of brake switches 16 are provided corresponding respectively to the plurality of brake operating tools.

The front wheel steering angle switch 18 detects whether the steering angle of the front wheels 2 is greater than or equal to a predetermined value. The front wheel steering angle switch 18 is provided on the front axle near the front wheels 2 (in the present embodiment, the left side front wheel 2). In the present embodiment, the front wheel steering angle switch 18 is used for front wheel steering angle detection.

The drive switching switch 20 is an operating tool for manually switching the drive mode of the tractor 1 to the four-wheel drive mode or the two-wheel drive mode. The drive switching switch 20 is provided in a position that enables operation by the operator of the operation portion 6.

The high-speed switching switch 21 is an operating tool for permitting or prohibiting automatic switching of the tractor 1 to a high-speed drive state in a predetermined case. The high-speed switching switch 21 is provided in a position that enables operation by the operator of the operation portion 6. Here, "high-speed drive state" denotes a state in which the front wheels 2 of the tractor 1 are rotationally driven at a faster ground speed than the rear wheels 3. Switching the tractor 1 to the high-speed drive state facilitates turning and makes it less likely that the contact area (agricultural land) will be damaged.

The mode switching switch 22 is an operating tool for manually switching the control mode of the main ECU 44 discussed later. The mode switching switch 22 is provided in a position that enables operation by the operator of the operation portion 6.

The threshold setting dial 24 is an operating tool for manually setting a threshold St of a slip ratio S discussed later. The threshold setting dial 24 is provided in a position that enables operation by the operator of the operation portion 6. In the present embodiment, the threshold setting dial 24 is used for threshold changing performed by the main ECU 44.

The axle rotation sensor 26 detects the drive speed on a power transmission path from the engine 4 to the drive wheels (in the present embodiment, the constantly rotationally driven rear wheels 3). The axle rotation sensor 26 is provided on the axle that transmits power to a differential mechanism on the rear wheel 3 side of the tractor 1, and is able to detect the drive speed of the axle.

Note that although the axle rotation sensor 26 detects the drive speed of the axle in the present embodiment, the present invention is not limited thereto. That is, the detection position is not limited as long as the axle rotation sensor 26 is able to detect the drive speed on the power transmission path to the drive wheels (rear wheels 3).

In the present embodiment, the axle rotation sensor 26 is used for slip ratio detection, drive speed detection, state detection and start detection performed by the main ECU 44.

The inclination sensor 28 detects an inclination angle θ in the front-back direction of the tractor 1 relative to a level surface. The inclination sensor 28 is provided in an appropriate position of the tractor 1. In the present embodiment, the inclination sensor 28 is used as an inclination angle detection unit.

The GPS module 30 receives a signal from a GPS satellite and detects the current position of the tractor 1. An antenna 30A of the GPS module 30 is provided in an upper portion of the cabin 7. In the present embodiment, the GPS module 30 is used for slip ratio detection performed by the main ECU 44.

The shift electromagnetic valve 32 performs an operation for shifting the power transmission device 5 by controlling the operation of a hydraulic clutch for shifting, which is a constituent element of the drive mode switching mechanism 5A of the power transmission device 5. The shift electromagnetic valve 32 is provided near the power transmission device 5. Note that although one shift electromagnetic valve 32 is illustrated in the drawings, a plurality of shift electromagnetic valves 32 are in fact provided in one-to-one correspondence with a plurality of hydraulic clutches which are constituent elements of the drive mode switching mechanism 5A.

The four-wheel drive electromagnetic valve 34 controls the operation of a hydraulic clutch for front-wheel drive which is a constituent element of the drive mode switching mechanism 5A, and generates the four-wheel drive mode or the two-wheel drive mode as a result. The four-wheel drive electromagnetic valve 34 is provided near the power transmission device 5.

The high-speed electromagnetic valve 35 controls the operation of a hydraulic clutch for high-speed which is one of the constituent elements of the high-speed drive mode switching mechanism 5B of the power transmission device 5, and, as a result, switches between the high-speed drive state and other states (two-wheel drive mode and four-wheel drive mode). The high-speed electromagnetic valve 35 is provided near the power transmission device 5. In the present embodiment, the high-speed electromagnetic valve 35 and the hydraulic clutch for high-speed are constituent elements of the high-speed drive mode switching mechanism 5B.

The slip warning buzzer 36 is a buzzer for warning the operator when the slip ratio S discussed later increases to a value approaching the threshold St. The slip warning buzzer 36 can emit a predetermined sound (beep). The slip warning buzzer 36 is provided in the operation portion 6. Note that it is also possible to adopt a configuration in which the operator is warned using a warning lamp or a liquid crystal display instead of the slip warning buzzer 36.

The GPS outage warning lamp 38 is a lamp (light-emitting instrument) for warning the operator, in the case where the GPS module 30 is unable to receive a signal from a GPS satellite. The GPS outage information buzzer can emit predetermined light. The GPS outage warning lamp 38 is provided in the operation portion 6. Note that it is also possible to adopt a configuration in which the operator is warned using a warning buzzer or a liquid crystal display instead of the GPS outage warning lamp 38.

The crank position sensor 40 detects the rotation position of a flywheel of the engine 4, and the actual number of revolutions (actual revolutions) of the engine 4 is detected based on a signal from this crank position sensor 40. The crank position sensor 40 is provided near the engine 4 (more specifically, near the flywheel of the engine 4). In the present embodiment, the signal from the crank position sensor 40 is used for state detection and actual revs detection performed by the main ECU 44.

The engine ECU 42 manages information on a common rail system of the engine 4, and controls the operations of connected devices. The engine ECU 42 is provided in the front portion of the body of the tractor 1. The engine ECU 42 is constituted by a storage unit, an arithmetic processing unit, and the like. A program and various data for controlling the common rail system of the engine 4 are stored by the engine ECU 42. The engine ECU 42 is connected to in-vehicle LAN, and is, for example, capable of exchanging information with the main ECU 44 via the in-vehicle LAN. The main ECU 44 is able to acquire various types of information about the engine 4, including information on the actual number of revolutions of the engine 4, and the like, from the engine ECU 42.

The engine ECU 42 is able to receive information on the actual revolutions of the engine 4 that is based on the crank position sensor 40. The engine ECU 42 is connected to each portion of the engine 4 (more specifically, the supply pump, rail, injector, various sensors, etc. (not shown)), and is able to control the operation (number of revolutions, etc.) of the engine 4. Note that although the engine 4 according to the present embodiment is provided with a common rail system, the present invention can also be applied to work vehicles that have an engine that is not provided with a common rail system.

The main ECU 44, which is a core element of the drive control system 10, manages various types of information for the drive control system 10 and controls the operations of connected devices. The main ECU 44 is disposed in the operation portion 6. The main ECU 44 is constituted by a program, a storage unit, an arithmetic processing unit, and the like. A program and various data for controlling the drive control system 10 are stored in the main ECU 44. The main ECU 44 is substantially constituted by a computer, and many of the functions of the main ECU 44 are realized by running the program.

Figure 9:
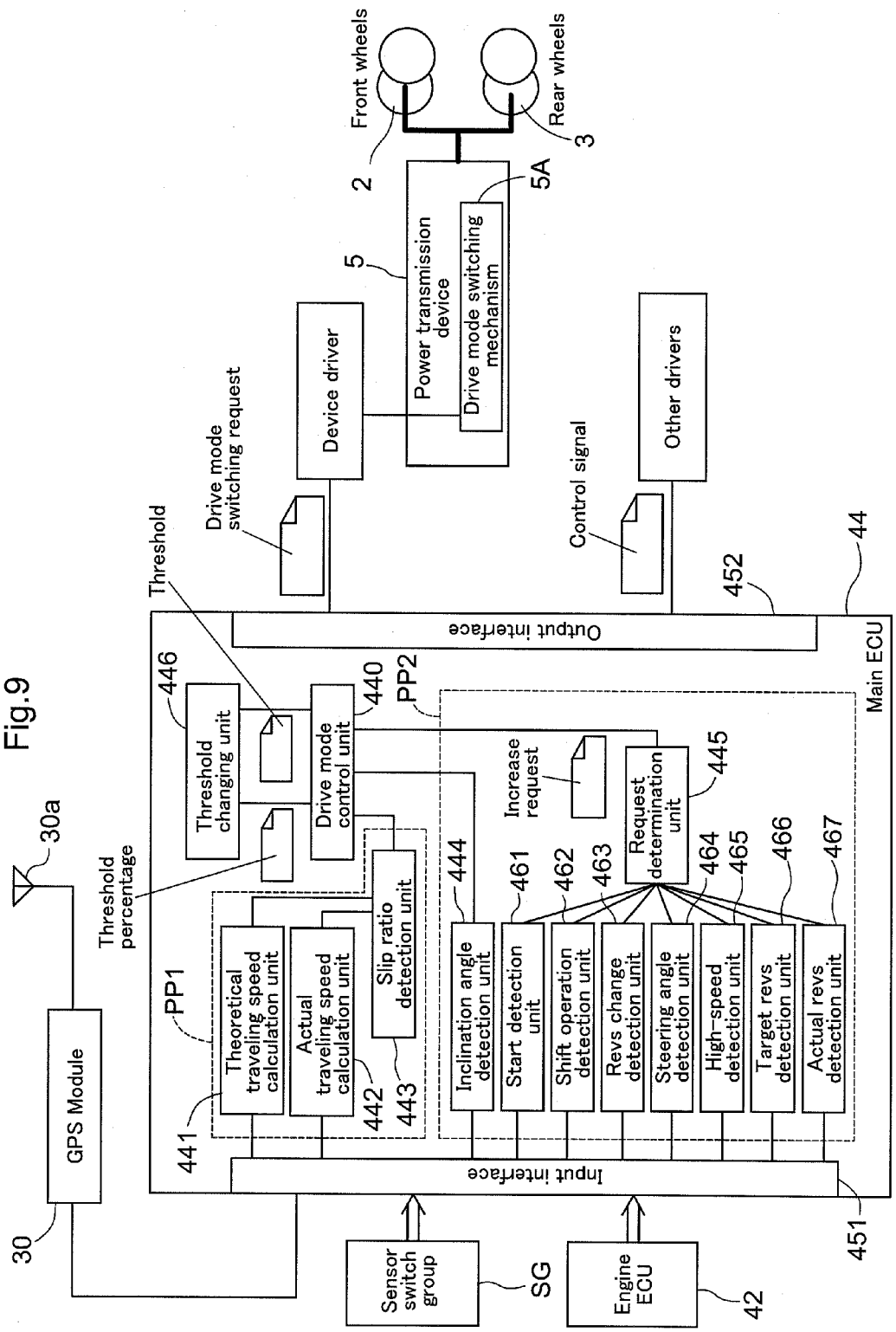
FIG. 9 is a functional block diagram showing functions of a main ECU.

In FIG. 9, functions particularly relating to the present invention, which are built into the main ECU 44, are illustrated. The main ECU 44 is provided with an input interface 451 for inputting various types of information and signals, and an output interface 452 for outputting various types of information and signals. Functional units particularly relating to the present invention, which are built into the main ECU 44, are a theoretical traveling speed calculation unit 441, an actual traveling speed calculation unit 442, a slip ratio detection unit 443, an inclination angle detection unit 444, a request determination unit 445, a threshold changing unit 446, a drive mode control unit 440, a start detection unit 461, a shift operation detection unit 462, a revs change detection unit 463, a steering angle detection unit 464, a high-speed detection unit 465, a target revs detection unit 466, and an actual revs detection unit 467.

The theoretical traveling speed calculation unit 441 calculates a theoretical traveling speed, which is an expected speed that is derived based on the drive speed in the power transmission device 5. It is also possible for the theoretical traveling speed to be calculated from the number of revolutions of the engine, the shift ratio of the power transmission device, and the wheel diameter. The actual traveling speed calculation unit 442 calculates an actual traveling speed of the vehicle based on position information of the vehicle from the GPS module 30. The slip ratio detection unit 443 calculates a slip ratio with respect to the contact area of the drive wheels from theoretical traveling speed and the actual traveling speed. The inclination angle detection unit 444 calculates the inclination angle in the front-back direction of the tractor 1 based on signals from a sensor switch group SG. The request determination unit 445 determines the need to increase drive power on the contact area of the tractor 1 based on signals from the sensor switch group SG, and outputs an increase request based on the determination result. The drive mode control unit 440 outputs a drive mode switching request to the drive mode switching mechanism 5A based on the slip ratio and the inclination angle. At this time, a drive mode switching request for switching to the four-wheel drive mode is output in the case where it is detected that the slip ratio has exceeded a preset threshold, and a drive mode switching request for switching to the two-wheel drive mode is output in the case where a reduction in the slip ratio and a reduction in the inclination angle are detected. The threshold can be arbitrarily changed by the threshold changing unit 446.

The request determination unit 445 outputs an increase request based on a predetermined determination algorithm. Input parameters that are used by this decision algorithm are the individual detection results of the start detection unit 461, the shift operation detection unit 462, the revs change detection unit 463, the steering angle detection unit 464, and the high-speed detection unit 465, or a combination of these detection results. The start detection unit 461, the shift operation detection unit 462, the revs change detection unit 463, the steering angle detection unit 464, the high-speed detection unit 465, the target revs detection unit 466, and the actual revs detection unit 467 derive respective detection results based on signals from the sensor switch group SG or the engine ECU 42. In other words, the start detection unit 461 detects the start of the tractor 1. An increase request is output from the request determination unit 445 in response to this start detection. The shift operation detection unit 462 detects shift operation events such as switching of shift steps that occurs in the power transmission device 5. An increase request is output from the request determination unit 445 in response to detection of a shift operation event. The revs change detection unit 463 detects a target revs change event in relation to the engine 4. An increase request is output from the request determination unit 445 in response to detection of a target revs change event. The steering angle detection unit 464 detects an over-steering angle at which the steering angle of the front wheels 2 formed as the steering wheels is greater than or equal to a predetermined value. The high-speed detection unit 465 detects the high-speed drive state in which the front wheels 2 are rotated at a faster ground speed than the rear wheels 3. The request determination unit 445 outputs a second increase request for requesting transition to the high-speed drive state in priority to an increase request, at the time of detection of an over-steering angle. The target revs detection unit 466 detects the target number of revolutions of the engine 4. The actual revs detection unit 467 detects the actual number of revolutions of the engine. When the actual number of revolutions is greater than the target number of revolutions by a predetermined value or more, an increase request is output from the request determination unit 445.

Devices such as the abovementioned switches and sensors are collectively referred to as the sensor switch group SG in this specification, and signals thereof or information based on the signals are directly and/or indirectly input to the main ECU 44. The main ECU 44 outputs control signals for operating the various electromagnetic valves, buzzers and lamps to respective drivers.

Note that it is also possible for the main ECU 44 to be constituted from a plurality of ECUs rather than only one ECU. Also, it is also possible to constitute the main ECU 44 and the engine ECU 42 with a single ECU.

The drive control system 10 has a "fixed mode" and an "auto mode" as control modes for appropriately switching the tractor 1 to the two-wheel drive mode or the four-wheel drive mode. When the mode switching switch 22 has been switched by the operator, the main ECU 44 switches the control mode to either the fixed mode or the auto mode.

Hereinafter, the fixed mode will be described first.

The fixed mode is a mode in which the operator is able to arbitrarily switch the tractor 1 to the two-wheel drive mode or the four-wheel drive mode. In the fixed mode, the main ECU 44 is able to switch the tractor 1 to the two-wheel drive mode or the four-wheel drive mode, based on operation of the drive switching switch 20.

That is, in the case where the operator operates the drive switching switch 20 to select the two-wheel drive mode, the main ECU 44 controls the operation of the four-wheel drive electromagnetic valve 34, and disconnects the hydraulic clutch for front-wheel drive. As a result, the two-wheel drive mode in which transmission of power to the front wheels 2 is cut and only the rear wheels 3 are rotationally driven can be set.

In the case where the operator operates the drive switching switch 20 to select the four-wheel drive mode, the main ECU 44 controls the operation of the four-wheel drive electromagnetic valve 34 and connects the hydraulic clutch for front-wheel drive. As a result, the four-wheel drive mode in which transmission of power to the front wheels 2 is enabled and the front wheels 2 and the rear wheels 3 are rotationally driven can be set.

Next, the auto mode will be described.

The auto mode is a mode in which the main ECU 44 automatically switches the tractor 1 to the two-wheel drive mode or the four-wheel drive mode, independently of operation of the drive switching switch 20 by the operator. Hereinafter, one control aspect (first control aspect) of the main ECU 44 in the auto mode will be described with reference to FIGS. 1 to 6.

The first control aspect is a control for appropriately eliminating slippage (improving the slip ratio S), in the case where slippage occurs while the tractor 1 is traveling. First, the flow of processing by the main ECU 44 in the first control aspect will be described, mainly with reference to FIG. 3.

In step S101, it is judged whether the slip ratio S of the tractor 1 exceeds the threshold St. Hereinafter, the processing of step S101 will be described in detail.

The slip ratio S is a value indicating how much the drive wheels of the tractor 1 have slipped relative to a contact area such as agricultural land. The slip ratio S(%) is calculated based on the formula $S=(Vi-Vp)/Vi \times 100$. Here, Vp is the speed at which the tractor 1 is actually traveling (actual traveling speed), and Vi is the theoretical traveling speed of the tractor 1.

The actual traveling speed Vp is the speed at which the tractor 1 is actually traveling relative to the contact area. The actual traveling speed Vp is calculated by the slip ratio detection unit 443 of the main ECU 44 based on the change in the position of the tractor 1. Specifically, the amount of change per unit time of the position of the tractor 1 is derived from information on the current position of the tractor 1 that is acquired from the GPS module 30, and the speed (actual traveling speed Vp) of the tractor 1 is calculated therefrom.

The theoretical traveling speed Vi is the (theoretical) traveling speed of the tractor 1 in the case where the drive wheels are not slipping on the contact area. The theoretical traveling speed Vi is calculated by the theoretical traveling speed calculation unit 441 of the main ECU 44 based on the drive speed of the drive wheels of the tractor 1. Specifically, the drive speed on the power transmission path from the axle rotation sensor 26 to the drive wheels is calculated, the drive speed of the drive wheels is calculated based on the drive speed on the power transmission path and a speed reduction ratio of the power transmission path that is stored in advance, and, furthermore, the theoretical traveling speed Vi of the tractor 1 is calculated based on the drive speed of the drive wheels and the diameter of the drive wheels.

For example, in the case where the tractor 1 moves without any slippage on the contact area, the actual traveling speed Vp will equal the theoretical traveling speed Vi (Vp=Vi), and the slip ratio S will be 0(%).

In the case where the drive wheels of the tractor 1 are completely spinning out on the contact area, the slip ratio S will be 100(%) since the actual traveling speed Vp is 0.

The threshold St is a value that serves as a condition when the main ECU 44 is automatically switching the tractor 1 to the two-wheel drive mode or the four-wheel drive mode. The threshold changing unit 446 of the main ECU 44 acquires information on the operating position of the threshold setting dial 24, and sets the threshold St based on the acquired information. That is, the operator is able to arbitrarily set the threshold St by operating the threshold setting dial 24.

When the slip ratio S of the tractor 1 has exceeded the threshold St, the processing transitions to step S102. When the slip ratio S of the tractor 1 has not exceeded the threshold St, the processing transitions to step S107. In step S102, the inclination angle $\theta$ in the front-back direction of the tractor 1 at the point in time at which it is judged that the slip ratio S of the tractor 1 exceeds the threshold St (step S101) is stored. After this processing has been performed, the processing transitions to step S103.

In step S103, the drive mode is automatically switched to the four-wheel drive mode. That is, in this case, the drive mode control unit 440 of the main ECU 44 sends a drive mode switching request to the drive mode switching mechanism 5A through an apparatus driver. The four-wheel drive electromagnetic valve 34 thereby operates and the hydraulic clutch for front-wheel drive is connected. As a result, the four-wheel drive mode in which power is transmitted to the front wheels 2 and the front wheels 2 and the rear wheels 3 are rotated is realized. Note that in the case where the drive mode is already in the four-wheel drive mode when this processing (step S103) is performed, this state is maintained. After the above processing (step S103) has been performed, the processing transitions to step S104.

In step S104, it is judged whether the slip ratio S of the tractor 1 is less than or equal to the threshold St. When the slip ratio S of the tractor 1 is less than or equal to the threshold St, the processing transitions to step S105. When the slip ratio S of the tractor 1 exceeds the threshold St, the processing of step S104 is repeated.

In step S105, it is judged whether the tractor 1 is approximately level in the front-back direction. Specifically, it is judged whether the inclination angle $\theta$ in the front-back direction of the tractor 1 is a value approaching 0(°) (e.g., $-1(°) \leq \theta \leq 1(°)$, etc.). When the tractor 1 is not an substantially level in the front-back direction, the processing transitions to step S106. When the tractor 1 is approximately level in the front-back direction, the processing transitions to step S107.

In step S106, it is judged whether the inclination angle $\theta$ in the front-back direction of the tractor 1 is less than or equal to a predetermined angle $\theta t$. Here, the predetermined angle $\theta t$ is set so as to be an angle less than the inclination angle $\theta$ stored in step S102. Also, the predetermined angle $\theta t$ is set so as to be predetermined percentage of the inclination angle $\theta$ stored in step S102. In the present embodiment, the predetermined angle $\theta t$ is a value of 50(%) of the inclination angle $\theta$ stored in step S102. The predetermined percentage is set (stored) in advance.

Note that the predetermined percentage of the inclination angle $\theta$ is not restricted to 50(%). The predetermined percentage may also be configured to be arbitrarily changeable by the operator using an operating tool (dial, etc.) provided in the tractor 1. It is also possible for the predetermined angle $\theta t$ to be set to a fixed value, rather than being a predetermined percentage of the inclination angle $\theta$.

When the inclination angle $\theta$ in the front-back direction of the tractor 1 is less than or equal to the predetermined angle $\theta t$, the processing transitions to step S107. When the inclination angle $\theta$ in the front-back direction of the tractor 1 exceeds the predetermined angle $\theta t$, the processing again transitions to step S104.

In step S107, the drive mode of the tractor 1 is automatically switched to the two-wheel drive mode. That is, in this case, the drive mode control unit 440 sends a drive mode switching request to the drive mode switching mechanism 5A via a device driver. The four-wheel drive electromagnetic valve 34 thereby operates and the hydraulic clutch for front-wheel drive is disconnected. As a result, the two-wheel drive mode in which transmission of the power to the front wheels 2 is cut and only the rear wheels 3 are rotated is realized. Note that in the case where the drive mode is already in the two-wheel drive mode at the point in time of the processing (step S107), that state is maintained.

A specific example of the first control aspect will be described with reference to FIGS. 3 to 5.

FIG. 4 is a time chart showing the change over time t in the drive state (the two-wheel drive mode or the four-wheel drive mode), the slip ratio S and the inclination angle $\theta$ of the tractor 1 when moving.

In the case where the slip ratio S exceeds the threshold St at time t1 while the tractor 1 is moving (see step S101 of FIG. 3, FIG. 5A), the inclination angle $\theta$ (in the present embodiment, given as $\theta1$) at the time (time t1) is stored (see step S102 of FIG. 3). Also, the drive mode control unit 440 automatically switches the drive mode to the four-wheel drive mode (see step S103 of FIG. 3, FIG. 5B). As a result, the slip ratio of the tractor 1 is improved (reduced), and the drive power on the contact area of the tractor 1 increases.

The slip ratio S of the tractor 1 decreases to less than or equal to the threshold St immediately after switching to the four-wheel drive mode (immediately after time t1) (see step S104 of FIG. 3). However, the tractor 1 is not approximately level (see step S105 of FIG. 3) and the inclination angle $\theta$ does not decrease to less than or equal to the predetermined angle $\theta t$ (in the present embodiment, given as $\theta2$ (=$\theta1 \times 50$(%)/100)) (see step S106 of FIG. 3). For this reason, the drive mode is maintained in the four-wheel drive mode.

In the case where the inclination angle $\theta$ decreases to less than or equal to the predetermined angle $\theta t$ ($\theta2$) at time t2 (see step S106 of FIG. 3, FIG. 5C), the drive mode control unit 440 automatically switches the drive mode to the two-wheel drive mode (see step S107 of FIG. 3).

In the case where the slip ratio S again exceeds the threshold St at time t3 (see step S101 of FIG. 3, FIG. 5D), the inclination angle $\theta$ (in the present embodiment, inclination angle $\theta=0$) at that point in time (time t3) is stored (see step S102 of FIG. 3). Also, the drive mode control unit 440 automatically switches the drive mode to the four-wheel drive mode (see step S103 of FIG. 3, FIG. 5E). As a result, the slip ratio of the tractor 1 is improved and the drive power on the contact area of the tractor 1 increases.

The slip ratio S of the tractor 1 decreases to less than or equal to the threshold St at time t4 after switching to the four-wheel drive mode (see step S104 of FIG. 3). Also, the tractor 1 is approximately level (inclination angle θ=0) at that point in time (time t4) (see step S105 of FIG. 3). Therefore, the drive mode control unit 440 automatically switches the drive mode to the two-wheel drive mode (see step S107 of FIG. 3, FIG. 5F).

As described above, in the first control aspect, in the case where the slip ratio S of the tractor 1 exceeds the threshold St (step S101 of FIG. 3), the drive mode is switched to the four-wheel drive mode (step S103 of FIG. 3). That is, the drive mode control unit 440 maintains the drive mode of the tractor 1 in the two-wheel drive mode, except when the slip ratio S of the tractor 1 increases (steps S101 and S107 of FIG. 3).

As a result, the tractor 1 can be caused to travel in the two-wheel drive mode whenever possible, and improvement in fuel consumption can be achieved.

Normally, in the four-wheel drive mode, the front wheels 2 rotate faster than the rear wheels 3. For this reason, when the tractor 1 travels over agricultural land in the four-wheel drive mode, the surface of the agricultural land gets damaged. Accordingly, damaging of the surface of agricultural land can be suppressed by causing the tractor 1 to travel in the two-wheel drive mode whenever possible. Also, when the tractor 1 travels on a paved road in the four-wheel drive mode, the front wheels 2 and the rear wheels 3 wear easily due to the difference in rotation between the front wheels 2 and the rear wheels 3. Accordingly, wearing of the front wheels 2 and the rear wheels 3 can be suppressed by causing the tractor 1 to travel in the two-wheel drive mode whenever possible.

In the case where there not is only a decrease in the slip ratio S of the tractor 1 to less than or equal to the threshold St (step S104 of FIG. 3) but where there is also a decrease in the inclination angle θ to less than or equal to the predetermined angle θt (step S106 of FIG. 3) or where the tractor 1 is approximately level (step S105 of FIG. 3), the drive mode is returned from the four-wheel drive mode to the two-wheel drive mode for the first time (step S107 of FIG. 3).

In this way, the drive mode returns from the four-wheel drive mode to the two-wheel drive mode in a state where the inclination angle θ of the tractor 1 has relaxed. The slip ratio S again exceeding the threshold St and the drive mode being switched straight back to the four-wheel drive mode immediately after being returned to the two-wheel drive mode, or in other words, repeatedly alternating between the two-wheel drive mode and the four-wheel drive mode, is thereby forestalled.

In the case where the slip ratio S exceeds the threshold St in a state where the tractor 1 is approximately level (step S101 of FIG. 3), it is difficult to detect the predetermined angle θt (in the present embodiment, further 50(%) of value approaching 0(°)) set so as to be a predetermined percentage of the inclination angle θ (value approaching 0(°)) with the inclination sensor 28. That is, it is difficult to detect a "decrease in the inclination angle θ to less than or equal to the predetermined angle θt" (step S106 of FIG. 3), which is the condition for returning from the four-wheel drive mode to the two-wheel drive mode. For this reason, the drive mode preferably returns to the two-wheel drive mode (step S107 of FIG. 3) in the case where the tractor 1 is approximately level (step S105 of FIG. 3).

In the case where the inclination angle θ decreases to less than or equal to a predetermined percentage (in the present embodiment, 50(%)) of the inclination angle θ after having automatically switched to the four-wheel drive mode, the drive mode is automatically switched from the four-wheel drive mode to the two-wheel drive mode. In other words, the predetermined angle θt is determined according to the state of the contact area when the slip ratio S has exceeded the threshold St (θt=k×(inclination angle after having automatically switched to the four-wheel drive mode), k: predetermined percentage). Slippage can thereby be appropriately eliminated. Appropriate elimination of slippage (improvement of the slip ratio S) according to the state of contact area can be anticipated, compared with the case where the predetermined angle θt is set to a fixed value.

When the tractor 1 is approximately level, the inclination angle θ of the tractor 1 has almost no influence on slippage. Accordingly, in this case, the drive mode is switched from the four-wheel drive mode to the two-wheel drive mode based only on the slip ratio S, irrespective of the inclination angle θ (more specifically, irrespective of whether the inclination angle θ has decreased to less than or equal to the predetermined angle θt). Slippage can thereby be appropriately eliminated.

Hereinafter, a modification of the first control aspect (control for appropriately eliminating slippage, in the case where slippage occurs while the tractor 1 is traveling) in the abovementioned auto mode will be described.

As a first modification of the first control aspect, it is also possible to adopt a configuration in which a hysteresis is provided in the threshold St of the slip ratio S.

That is, the gist of this technology is to provide a difference between the value (hereinafter, simply "the threshold S4") of the threshold St (step S101 of FIG. 3) which serves as a reference of the slip ratio S when switching from the two-wheel drive mode to the four-wheel drive mode and the value (hereinafter, simply "the threshold S2") of the threshold St (step S104 of FIG. 3) which serves as a reference of the slip ratio S when returning from the four-wheel drive mode to the two-wheel drive mode. Specifically, the values are set so that the value of the threshold S2 is appropriately smaller than the value of the threshold S4. For example, if the threshold S4 is 10(%), the threshold S2 is set to 6(%). In this way, reoccurrence of slippage immediately after returning from the four-wheel drive mode to the two-wheel drive mode (the slip ratio S again exceeding the threshold St (S4)) is prevented, by setting the value of the threshold S2 to be slightly smaller than the value of the threshold S4.

Furthermore, as a condition for returning from the four-wheel drive mode to the two-wheel drive mode (step S104 of FIG. 3), the elapse of a predetermined time period in a state where the slip ratio S is less than or equal to the threshold St (threshold S2) may be introduced. In this way, reoccurrence of slippage immediately after returning to the two-wheel drive mode (the slip ratio S again exceeding the threshold St (S4)) is prevented, by returning to the two-wheel drive mode after predetermined time period has elapsed in a state where the slip ratio S is low.

As a second modification of the first control aspect, it is also possible to warn the operator when the slip ratio S increases to a value Sr approaching the threshold St. The main ECU 44 emits a beep from the slip warning buzzer 36, in the case where the slip ratio S of the tractor 1 increases to the value Sr (<St) approaching the threshold St. The operator can be made aware that the tractor 1 is slipping (that there has been a certain increase in the slip ratio S) by hearing the beep from the slip warning buzzer 36.

As a third modification of the first control aspect, it is also possible to warn the operator and to switch the tractor 1 to the four-wheel drive mode, when the GPS module 30 is not receiving a signal from a GPS satellite. The main ECU 44 illuminates the GPS outage warning lamp 38, in the case where the GPS module 30 is not receiving a signal from a GPS satellite. The operator can be made aware that the GPS function cannot be used, that is, the slip ratio S cannot be calculated, viewing the illumination of the GPS outage warning lamp 38.

In this case, the drive mode is switched to the four-wheel drive mode. When the slip ratio S cannot be calculated, the tractor 1 is thereby constantly maintained in the four-wheel drive mode, and the occurrence of slippage (increase in the slip ratio S) can be forestalled.

Figure 6:
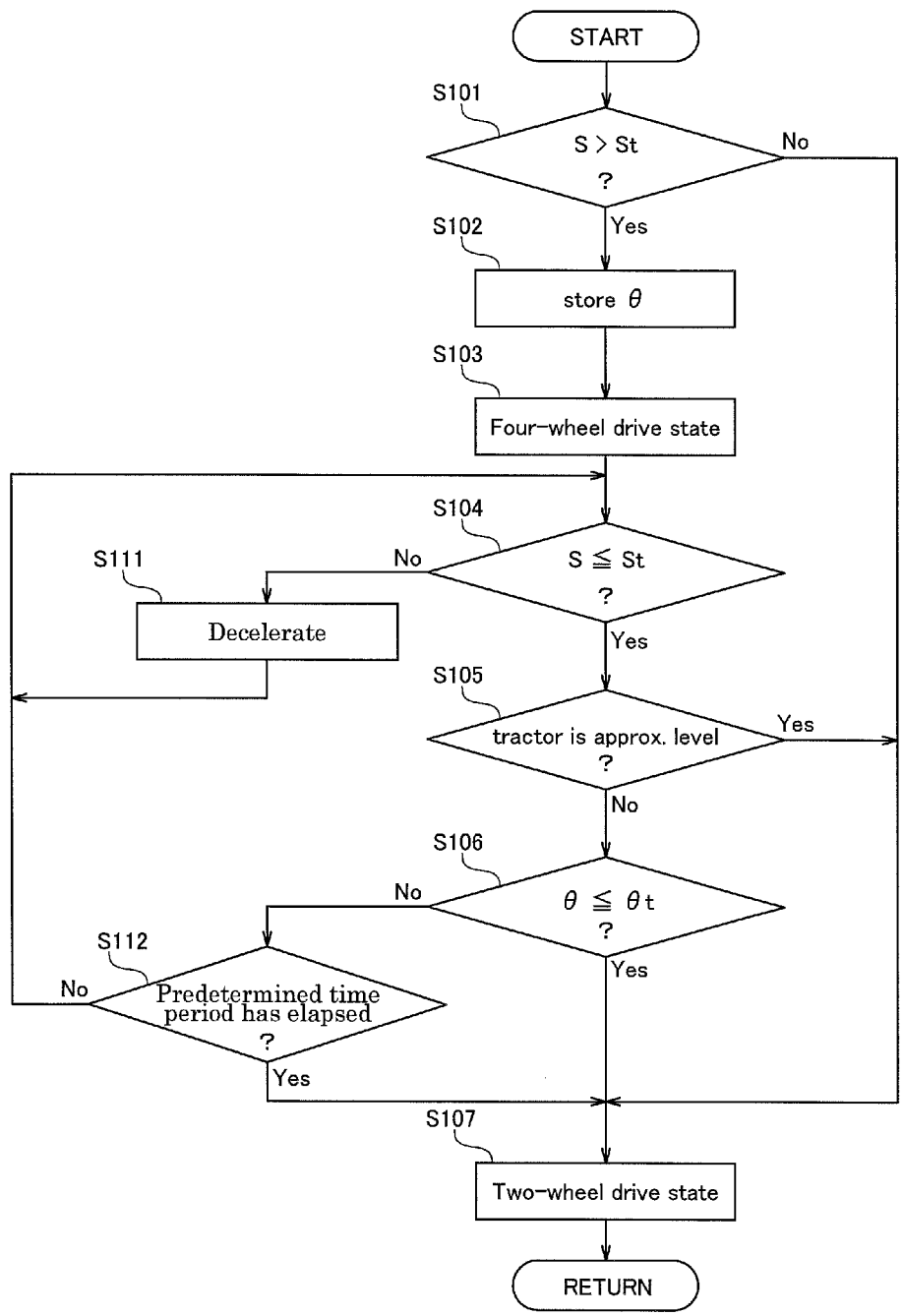
FIG. 6 is a flowchart showing a modification of the first control aspect.

A fourth modification of the first control aspect is shown in FIG. 6. Note that, in the flowchart shown in the FIG. 6, processing that is similar to the flowchart shown in the abovementioned FIG. 3 is given the same reference signs and hereinafter description thereof will be omitted.

As the fourth modification of the first control aspect, it is also possible to perform an operation for shifting the power transmission device 5 and decelerate the tractor 1, in the case where the slip ratio S still does not decrease to less than or equal to the threshold St (step S104) even when the drive mode switches to the four-wheel drive mode. Hereinafter, this modification will be described in detail.

In step S104 of FIG. 6, it is judged whether the slip ratio S of the tractor 1 is less than or equal to the threshold St. If the slip ratio S is less than or equal to the threshold St, the processing transitions to step S105. If the slip ratio S exceeds the threshold St, the processing transitions to step S111.

In step S111, the main ECU 44 decelerates the tractor 1. That is, in this case, the main ECU 44 controls the operation of the shift electromagnetic valve 32, and switches the hydraulic clutch for shifting. As a result, the shift ratio (speed reduction ratio) of the power transmission device 5 is switched so that the tractor 1 decelerates.

After the above processing, the processing again transitions to step S104.

In this way, in the case where the slip ratio S still does not decrease to less than or equal to the threshold St (step S104) even when the drive mode is switched to the four-wheel drive mode (step S103), the tractor 1 decelerates with a shift operation on the power transmission device 5 (step S111). Slippage is thereby more reliably eliminated.

Note that in the case where the slip ratio S does not decrease to less than or equal to the threshold St even when the tractor 1 is decelerated, a diff lock may further be operated (differential mechanism may be locked). Slippage is thereby more reliably eliminated.

A fifth modification of the first control aspect is shown in FIG. 6. In this fifth modification, in the case where the inclination angle θ does not decrease to less than or equal to the predetermined angle θt (step S106) in a state where the drive mode has been switched to the four-wheel drive mode (step S103) and the slip ratio S has decreased less than or equal to the threshold St (step S104), the drive mode is switched from the four-wheel drive mode to the two-wheel drive mode when a predetermined time period elapses in this state, irrespective of the inclination angle θ. This modification will be described in detail hereinafter.

In step S106 of FIG. 6, it is judged whether the inclination angle θ in the front-back direction of the tractor 1 is less than or equal to the predetermined angle θt. In the case where this inclination angle θ is less than or equal to the predetermined angle θt, the processing transitions to step S107. In the case where this inclination angle θ exceeds the predetermined angle θt, the processing transitions to step S112.

In step S112, it is judged whether a predetermined time period has elapsed in a state where the slip ratio S is less than or equal to the threshold St (step S104). If the predetermined time period has elapsed with the slip ratio S less than or equal to the threshold St, the processing shifts to step S107. If the predetermined time period has not elapsed with the slip ratio S less than or equal to the threshold St, the processing again shifts to step S104.

In this way, in the case where the drive mode is switched to the four-wheel drive mode (step S103), the slip ratio S decreases to less than or equal to the threshold St (step S104), and, furthermore, the inclination angle θ does not decrease to less than or equal to the predetermined angle θt (step S106), the drive mode is switched to the two-wheel drive mode (step S107) when a predetermined time period has elapsed in this state (step S112), irrespective of the inclination angle θ. Improvement in the fuel consumption of the tractor 1 is achieved, by limiting the time period for which the drive mode is continued in the four-wheel drive mode to a given fixed time period (a predetermined time period from when the slip ratio S decreases to less than or equal to the threshold St), and switching to the two-wheel drive mode thereafter.

As a sixth modification of the first control aspect, it is also possible to set a plurality of the thresholds St of the slip ratio S. That is, the main ECU 44 stores a plurality of thresholds St according to conditions such as the state of agricultural land, the inclination angle, and the type of work. Thresholds St set according to conditions when the tractor 1 is actually traveling are used as values of the slip ratio S that serve as references when switching between the two-wheel drive mode and the four-wheel drive mode of the tractor 1.

Note that, in this case, it is also possible to provide the tractor 1 with a plurality of threshold setting dials 24 for respectively setting the plurality of thresholds St. It is also possible for the operator to use a switch or the like to arbitrarily select which of the plurality of set thresholds St to use in controlling the tractor 1.

Hereinafter, one of the control aspects (second control aspect) in the auto mode will be described, with reference to FIGS. 1, 2 and 7.

The second control aspect is a control for increasing the drive power, in the case where it is desirable to increase the drive power on the contact area of the tractor 1.

Hereinafter, the flow of processing by the main ECU 44 in the second control aspect will be described, mainly with reference to FIG. 7.

In step S201, it is judged whether the tractor 1 is braking (whether the brakes are applied). Specifically, if the brake operating tool is being operated, it is judged that the tractor 1 is braking. When the tractor 1 is not braked, the processing transitions to step S202. When the tractor 1 is braking, the processing transitions to step S209.

In step S202, it is judged whether the engine 4 is coasting. Hereinafter, the processing of step S202 will be described in detail. A state where the engine 4 is coasting is where the tractor 1 accelerates due to gravity when traveling downhill or the like, and the actual number of revolutions of the engine 4 is greater than the target number of revolutions by a predetermined value or more. The "predetermined value" can be arbitrarily set and is stored in the main ECU 44 in advance.

In the case where the actual number of revolutions of the engine 4 is not greater than the target number of revolutions of the engine 4 set based on the operating position of the accelerator operating tool by a predetermined value or more, it is judged that the engine 4 is not coasting, and the processing shifts to step S203.

If the actual number of revolutions of the engine 4 is greater than the target number of revolutions by a predetermined value or more, it is judged that the engine 4 is coasting, and the processing shifts to step S209.

In step S203, it is judged whether the tractor 1 has just started traveling. Hereinafter, the processing of step S203 will be described in detail.

The main ECU 44 acquires information about the drive speed on the power transmission path from the axle rotation sensor 26 to the drive wheels. In the case where the drive speed changes from a zero state, it is judged that the tractor 1 started traveling.

A time interval from when the tractor 1 starts traveling until when a predetermined time period has elapsed is here regarded as being immediately after the tractor has started traveling. The "predetermined time period" can be arbitrarily set, and is stored in the main ECU 44 in advance. Note that the "predetermined time period" desirably is set based on testing, numerical computations or the like, so as to be a larger value than the time required for the speed to stabilize after the tractor 1 has started traveling. If the tractor has not just started, the processing transitions to step S204. If the tractor has just started, the processing transitions to step S207.

In step S204, it is judged whether the tractor 1 is accelerating/decelerating (accelerating or decelerating). Hereinafter, the processing of step S204 will be described in detail.

If an operation for shifting the power transmission device 5 has been performed (shift operation event has occurred) or if an operation for changing the target number of revolutions of the engine 4 has been performed, the main ECU 44 judges that the tractor 1 has accelerated/decelerated.

The main ECU 44 judges that an operation for shifting the power transmission device 5 has been performed, if the operating position of the shift operating tool has been changed.

The main ECU 44 judges that an operation for changing the target number of revolutions of the engine 4 has been performed (engine revolutions change event has occurred), if the operating position of the accelerator operating tool has been changed.

A time interval from when the tractor 1 has accelerated/decelerated until when a predetermined time period has elapsed is regarded as being during acceleration/deceleration of the tractor. The "predetermined time period" can be arbitrarily set, and is stored in the main ECU 44 in advance. Note that the "predetermined time period" desirably is set based on testing, numerical computations or the like, so as to be a larger value than the time required for the speed to stabilize after the tractor 1 accelerates/decelerates.

If the tractor 1 is not accelerating/decelerating, the processing transitions to step S205. If the tractor 1 is accelerating/decelerating, the processing transitions to step S207. In step S205, it is judged whether slippage has occurred. Specifically, if the slip ratio S exceeds the threshold St, it is judged that slippage has occurred. If slippage has not occurred, the processing transitions to step S206. If slippage has occurred, the processing transitions to step S207.

In step S206, the drive mode is automatically switched to the two-wheel drive mode. That is, in this case, the drive mode control unit 440 of the main ECU 44 sends a drive mode switching request to the drive mode switching mechanism 5A via the device driver. The four-wheel drive electromagnetic valve 34 thereby operates and disconnects the hydraulic clutch for front-wheel drive. As a result, the two-wheel drive mode in which transmission of the power to the front wheels 2 is cut and only the rear wheels 3 are rotated is realized. Note that if the drive mode is already in the two-wheel drive mode when this processing (step S206) is performed, that state is maintained.

In step S207, it is judged whether the tractor 1 is traveling at high speed. Specifically, in the case where the actual traveling speed Vp of the tractor 1 exceeds the threshold Vt, it is judged that the tractor 1 is traveling at high speed. The threshold Vt is the value of the actual traveling speed Vp that serves as a reference when judging whether the tractor 1 is traveling at high speed. The threshold Vt can be arbitrarily set (e.g., 20 (km/h), etc.), and is stored in the main ECU 44 in advance. If the tractor 1 is not traveling at high speed, the processing transitions to step S208. If the tractor 1 is traveling at high speed, the processing transitions to step S206.

In step S208, it is judged whether the tractor 1 is turning. Specifically, if the steering angle of the front wheels 2 is greater than or equal to a predetermined value, it is judged that the tractor 1 is turning. This "predetermined value" can be arbitrarily set (e.g., 30(°), etc.), and can be adjusted by changing the attachment position of the front wheel steering angle switch 18. If the tractor 1 is not turning, the processing transitions to step S209. If the tractor 1 is turning, the processing transitions to step S206.

In step S209, the drive mode is automatically switched to the four-wheel drive mode. That is, in this case, the main ECU 44 controls the operation of the four-wheel drive electromagnetic valve 34, and connects the hydraulic clutch for front-wheel drive. The four-wheel drive mode is thereby realized. Note that if the tractor 1 is already in the four-wheel drive mode when this processing (step S209) is performed, that state is maintained.

(1) In the case where the tractor 1 is braking (step S201), the drive mode is automatically switched to the four-wheel drive mode (step S209). As a result, the drive power of the tractor 1 is increased, stabilizing the posture of the tractor 1 and shortening the braking distance of the tractor 1.

(2) In the case where the engine 4 is coasting (step S202), the drive mode is automatically switched to the four-wheel drive mode (step S209). As a result, the drive power of the tractor 1 is increased, enabling the posture of the tractor 1 to be stabilized.

(3) In the case where the tractor 1 has just started traveling (step S203), the drive mode is automatically switched to the four-wheel drive mode (step S209). As a result, the drive power of the tractor 1 can be increased, and the tractor 1 can be quickly started.

(4) In the case where the tractor 1 is accelerating/decelerating (step S204), the drive mode is automatically switched to the four-wheel drive mode (step S209). As a result, the drive power of the tractor 1 can be increased, and the tractor 1 can be quickly accelerated/decelerated.

(5) In the case where slippage has occurred (step S205), the drive mode is automatically switched to the four-wheel drive mode (step S209). As a result, the drive power of the tractor 1 can be increased and the slippage of the tractor 1 can be eliminated.

(6) Even in the case where the tractor 1 has just started traveling (step S203), or is accelerating/decelerating (step S204), or has slipped (step S205), the drive mode is automatically switched to the two-wheel drive mode (step S206)

if the tractor 1 is traveling at high speed (step S207). As a result, the tractor 1 can be easily steered compared with the four-wheel drive mode.

(7) Even in the case where the tractor 1 has just started traveling (step S203), or is accelerating/decelerating (step S204), or has slipped (step S205), the drive mode is automatically switched to the two-wheel drive mode (step S206) if the tractor 1 is turning (step S208). As a result, the turning radius of the tractor 1 can be reduced compared with the four-wheel drive mode, and damaging of the contact area (agricultural land) can be prevented.

Hereinafter, a modification of the second control aspect in the abovementioned auto mode will be described. The modification of the second control aspect is shown in FIG. 8. Note that in the flowchart shown in FIG. 8, processing that is similar to the flowchart shown in FIG. 7 is given the same reference signs and, hereinafter, description thereof will be omitted.

As a modification of the second control aspect, it is also possible to adopt a configuration in which the tractor 1 is switched to the high-speed drive state in priority to over other states, in the case where the tractor 1 is turning. Hereinafter, this modification will be described in detail.

Figure 7:
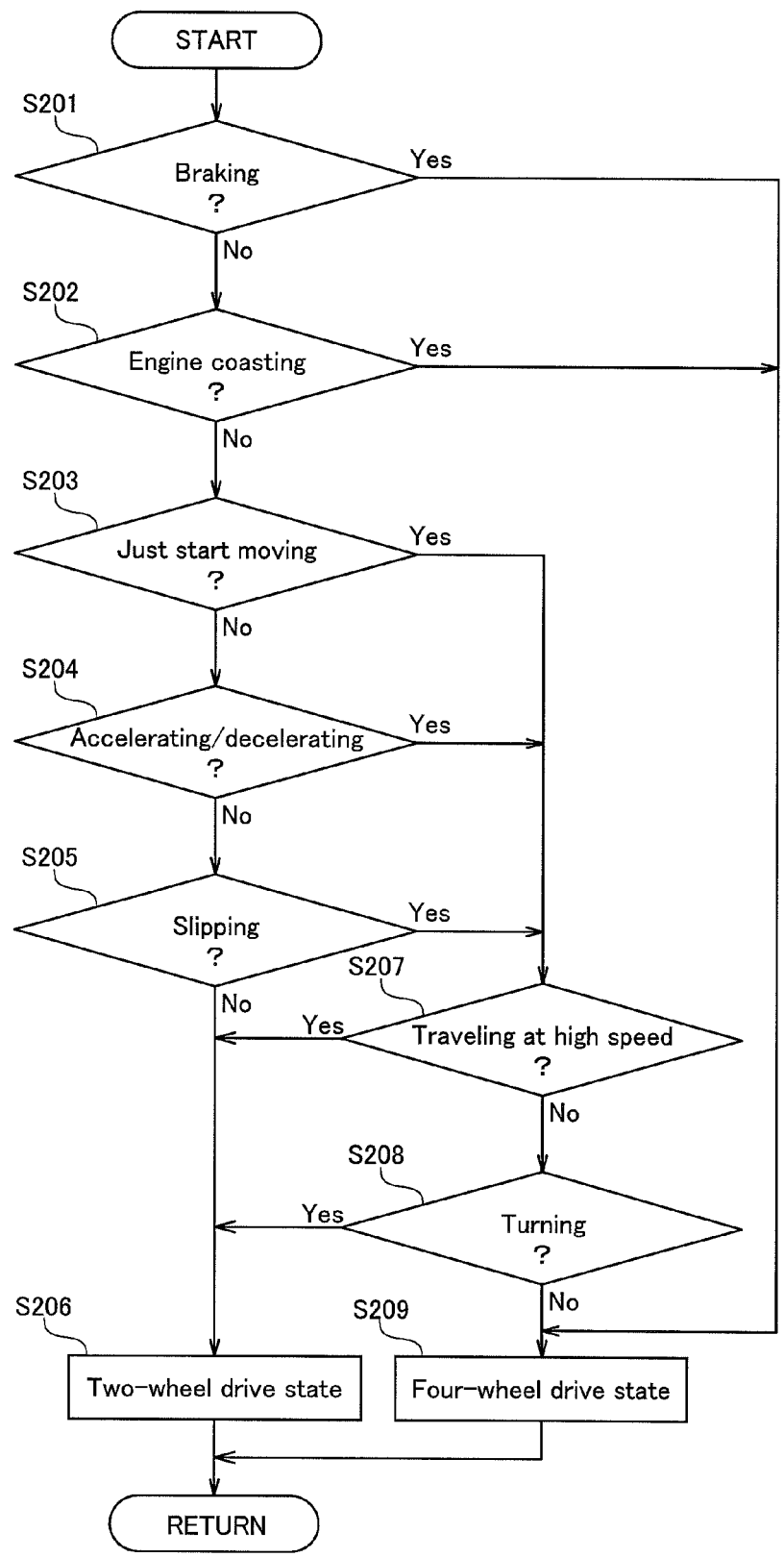
FIG. 7 is a flowchart showing a second control aspect.
Figure 8:
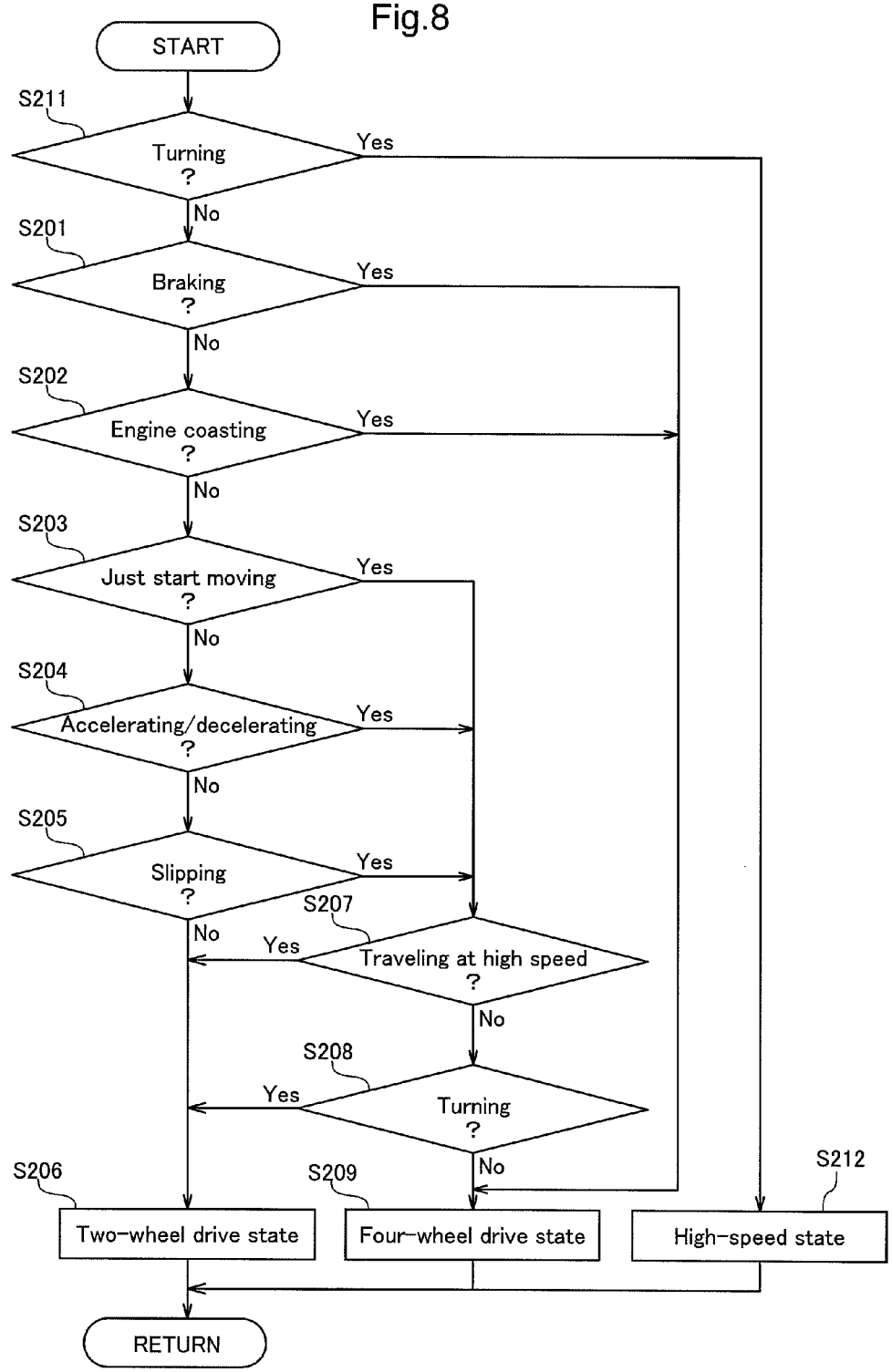
FIG. 8 is a flowchart showing a modification of the second control aspect.

When the high-speed switching switch 21 has been switched by the operator, and switching of the tractor 1 to the high-speed drive state automatically is permitted in predetermined cases, the main ECU 44 performs the control shown in FIG. 8 instead of the control shown in FIG. 7.

In step S211 of FIG. 8, it is judged whether the tractor 1 is turning. Specifically, the main ECU 44 judges that the tractor 1 is turning, if the steering angle of the front wheels 2 is greater than or equal to a predetermined value. The "predetermined value" can be arbitrarily set (e.g., 40(°), etc.), and can be adjusted by changing the attachment position of the front wheel steering angle switch 18.

If the tractor 1 is not turning, the processing transitions to step S201. If the tractor 1 is turning, the processing transitions to step S212.

In step S212, the drive mode is automatically switched to the high-speed drive state. That is, in this case, the drive mode control unit 440 of the main ECU 44 sends a drive mode switching request to the high-speed drive mode switching mechanism 5B via the device driver. The high-speed electromagnetic valve 35 which is a constituent element of the high-speed drive mode switching mechanism 5B thereby operates and connects the hydraulic clutch for double speed. As a result, the high-speed drive state in which power of a faster drive speed than usual (four-wheel drive mode) is transmitted to the front wheels 2 and the front wheels 2 are rotationally driven at a faster ground speed than the rear wheels 3 is realized. Note that in the case where the tractor 1 is already in the high-speed drive state when this processing (step S212) is performed, that state is maintained.

In this way, in the case where the tractor 1 is turning (step S211), the tractor 1 is switched to the high-speed drive state (step S212) in priority to other controls (steps S201 to S209). As a result, the front wheels 2 can be rotationally driven at a faster ground speed than the rear wheels 3 when the tractor 1 is turning, which facilitates turning and makes it less likely that the contact area will be damaged Note that in the above embodiment, the control aspects of the main ECU 44 in the auto mode were divided into a first control aspect and a second control aspect and described separately. However, it is also possible for the main ECU 44 to perform the two controls of the first control aspect and the second control aspect in parallel in the auto mode.

In this case, it is possible, for example, to apply the first control aspect (FIG. 3) instead of controls for switching to the four-wheel drive mode (steps S205 and S209 of FIG. 7) in the case where slippage occurs when the tractor 1 is in the second control aspect.

In the above embodiment, the main ECU 44 was described as performing control for automatically switching the tractor 1 to the high-speed drive state as a modification of the second control aspect in the auto mode. However, it is also possible for the main ECU 44 to perform control for switching the tractor 1 to the high-speed drive state, in the case where the tractor 1 is turning in the fixed mode.

Any event may be detected as long as the request determination unit 445 is able to detect a state in which it is desirable to increase the drive power on the contact area of the tractor 1. For example, the signal of a sensor that detects the state of the contact area (agricultural land) of the tractor 1 or the signal of a sensor that detects the type of work that is carried out by the tractor 1 (type of implements with which the tractor 1 is equipped) may be used.

The revs change detection unit 463 need only use a signal indicating that an operation for changing the target number of revolutions of the engine 4 of the tractor 1 has been performed. The signal from a sensor that detects that a linkage mechanism coupled to the accelerator operating tool has moved or information from the engine ECU 42 for controlling the operation of the engine 4 may be used. The engine ECU 42 may also be used as the revs change detection unit 463.

The target revs detection unit 466 may be anything that provides a signal indicating the target number of revolutions of the engine 4 of the tractor 1. For example, the signal from a sensor that detects the operating position of the linkage mechanism coupled to the accelerator operating tool or information from the engine ECU 42 may be used. The engine ECU 42 may also be used as the target revs detection unit 466.

The shift operation detection unit 462 may be anything that provides a signal indicating that an operation for shifting the power transmission device 5 of the tractor 1 has been performed. For example, the signal from a sensor that detects that the linkage mechanism coupled to the shift operating tool has moved or a signal for controlling the shift electromagnetic valve 32 to perform an operation for shifting the power transmission device 5 may be used.

The steering angle detection unit 464 may be anything that provides a signal indicating that the steering angle of the front wheels 2 is greater than or equal to a predetermined value. For example, the signal from a potentiometer or the like that is capable of detecting the steering angle of the front wheels 2 may be used. Also, the signal from a sensor that detects the turning angle of the steering wheel 6A or the like and indirectly detects the steering angle of the front wheels 2 may be used, instead of a sensor that directly detects the steering angle of the front wheels 2.

The threshold changing unit 446 need only be capable of arbitrarily changing the threshold St. For example, various types of switches (slide switch, toggle switch, etc.) or a touch panel may be used.

The slip ratio detection unit 443 need only be able to detect the slip ratio S of the wheels on the contact area. For example, a configuration for calculating the actual traveling speed Vp using another sensor such as a ground sensor and detecting the slip ratio S from the actual traveling speed Vp may be adopted. Also, a configuration for detecting the slip ratio S from the difference in drive speed between the front wheels 2 and the rear wheels 3 using sensors that respectively detect the drive speed (number of rotations) of the front wheels 2 and the rear wheels 3 may be adopted.

A configuration for detecting the drive speed based on the actual number of revolutions of the engine 4 and the speed reduction ratio of the power transmission path may be adopted.

The start detection unit 461 may be anything that provides a signal indicating that the tractor 1 has started traveling. For example, the signal from a sensor that detects the state (connected or disconnected) of a clutch for enabling and disabling transmission of power to the wheels of the tractor 1 or the signals from sensors (the accelerator sensor 12 and the shift position detection sensor 14) that detect the operating position of the accelerator operating tool and the shift operating tool may be used.

The inclination angle detection unit 444 need only provide a signal indicating the inclination angle in the front-back direction of the tractor 1. For example, a configuration (image-processing unit) for detecting the inclination angle in the front-back direction of the tractor 1 from an image captured of the tractor 1 may be adopted.

The drive mode switching mechanism 5A need only be able to switch drive mode between the four-wheel drive mode in which drive power is transmitted to the front wheels 2 and the rear wheels 3 of the tractor 1 and the two-wheel drive mode in which drive power is transmitted to only the rear wheels 3. For example, another actuator for controlling the operation of the clutch for front-wheel drive provided in the power transmission device 5 may be used.

The actual revs detection unit may be anything that provides a signal indicating the actual number of revolutions of the engine 4. For example, the signal from a sensor that detects the pulsation of a fuel injection tube of the engine 4 or the signal from a sensor that detects the number of rotations of an alternator may be used.

The drive mode control unit 440 may be constructed separately to the main ECU 44. The drive control system 10 may be provided externally to the tractor 1, and may be constituted as an ECU that is controllable wirelessly (or by cable).

The function of the main ECU 44 shown in FIG. 9 can be divided between the drive mode control unit 440, which outputs drive mode switching requests, and two preprocessing units, namely, a first preprocessing unit PP1 and a second preprocessing unit PP2, that provide information necessary in order to select the drive mode to this drive mode control unit 440. The theoretical traveling speed calculation unit 441, the actual traveling speed calculation unit 442, and the slip ratio detection unit 443 are included in the first preprocessing unit PP1. The inclination angle detection unit 444, the request determination unit 445, the start detection unit 461, the shift operation detection unit 462, the revs change detection unit 463, the steering angle detection unit 464, the high-speed detection unit 465, the target revs detection unit 466, and the actual revs detection unit 467 are included in the second preprocessing unit PP2. Although both the first preprocessing unit PP1 and the second preprocessing unit PP2 are provided in the description of the abovementioned embodiment, it should be obvious that only one of the preprocessing units may be provided. It is also possible to provide both the first preprocessing unit PP1 and the second preprocessing unit PP2, and to use either one selectively or to use both, through a manual switch.

What is claimed is:

1. A drive control system for a work vehicle, comprising:
a power transmission device having a drive mode switching mechanism that performs drive mode switching between a four-wheel drive mode in which drive power is transmitted to front wheels and rear wheels and a two-wheel drive mode in which drive power is transmitted to only the rear wheels;
a request determination unit that determines a necessity for an increase in drive power on a contact area of the work vehicle, and outputs an increase request depending on the determination result;
a drive mode control unit that outputs a drive mode switching request for switching to the four-wheel drive mode to the drive mode switching mechanism, in response to output of the increase request; and
a target revs detection unit that detects a target number of revolutions of an engine of the work vehicle,
wherein the request determination unit determines that the increase in drive power is necessary and outputs the increase request, when an actual number of revolutions of the engine is greater than the target number of revolutions by a predetermined value or more, and wherein the predetermined value is stored.

2. The drive control system for a work vehicle according to claim 1, further comprising a start detection unit that detects that the work vehicle has started traveling,
wherein the request determination unit outputs the increase request, in response to the start detection unit detecting that the work vehicle has started traveling.

3. The drive control system for a work vehicle according to claim 2, wherein the drive mode control unit cancels the increase request, when it is judged that the work vehicle is traveling travelling at a high speed exceeding a predetermined value.

4. The drive control system for a work vehicle according to claim 1, further comprising a shift operation detection unit that detects a shift operation event of the power transmission device,
wherein the request determination unit outputs the increase request, in response to the shift operation detection unit detecting the shift operation event.

5. The drive control system for a work vehicle according to claim 4, wherein the drive mode control unit cancels the increase request, when it is judged that the work vehicle is traveling travelling at a high speed exceeding a predetermined value.

6. The drive control system for a work vehicle according to claim 1, further comprising an engine revs change detection unit that detects a target revs change event with respect to an engine of the work vehicle,
wherein the request determination unit outputs the increase request, in response to the engine revs change detection unit detecting the target revs change event.

7. The drive control system for a work vehicle according to claim 6, wherein the drive mode control unit cancels the increase request, when it is judged that the work vehicle is traveling travelling at a high speed exceeding a predetermined value.

8. A drive control system for a work vehicle, comprising:
a power transmission device having a drive mode switching mechanism that performs drive mode switching among a four-wheel drive mode in which drive power is transmitted to front wheels and rear wheels, a two-wheel drive mode in which drive power is transmitted to only the rear wheels, and a high-speed drive mode in which the front wheels are rotated at a faster ground speed than the rear wheels;
a steering angle detection unit that detects an oversteering angle at which a steering angle of the front wheels formed as steering wheels is greater than or equal to a predetermined value;
a request determination unit that determines a necessity for an increase in drive power on a contact area of the work vehicle, and outputs an increase request depending on the determination result, the request determination unit outputting a special increase request that overrides the increase request when the over-steering angle is detected and even when the determination result satisfies a condition for outputting the increase request; and
a drive mode control unit that outputs a drive mode switching request to the drive mode switching mechanism,
wherein the drive mode control unit outputs the drive mode switching request for switching to the four-wheel drive mode, in response to output of the increase request;
wherein the drive mode control unit outputs the drive mode switching request for switching to the high-speed drive mode, in response to output of the special increase request;
wherein the power transmission device remains in the four-wheel drive mode and the drive mode switching mechanism initiates the high-speed drive mode in response to output of both the increase request and the special increase request; and
wherein the drive mode control unit cancels the four-wheel drive mode based on the increase request and outputs the drive mode switching request for switching to the two-wheel drive mode, when it is judged that the work vehicle is traveling travelling at a high speed exceeding a predetermined value.

9. A drive control system for a work vehicle, comprising:
a power transmission device having a drive mode switching mechanism that performs drive mode switching among a four-wheel drive mode in which drive power is transmitted to front wheels and rear wheels, a two-wheel drive mode in which drive power is transmitted to only the rear wheels, and a high-speed drive mode in which the front wheels are rotated at a faster ground speed than the rear wheels;
a steering angle detection unit that detects an over-steering angle at which a steering angle of the front wheels formed as steering wheels is greater than or equal to a predetermined value;
a braking state detection unit that detects a braking state of the work vehicle based on a braking operation of a braking tool;
a request determination unit that outputs an increase request when the braking state of the work vehicle is detected, the request determination unit outputting a special increase request that overrides the increase request when the over-steering angle is detected and even when the braking state of the work vehicle is detected; and
a drive mode control unit that outputs a drive mode switching request to the drive mode switching mechanism,
wherein the drive mode control unit outputs the drive mode switching request for switching to the four-wheel drive mode, in response to output of the increase request;
wherein the drive mode control unit outputs the drive mode switching request for switching to the high-speed drive mode, in response to output of the special increase request; and
wherein the power transmission device remains in the four-wheel drive mode and the drive mode switching mechanism initiates the high-speed drive mode in response to output of both the increase request and the special increase request.

10. A drive control system for a work vehicle, comprising:
a power transmission device having a drive mode switching mechanism that performs drive mode switching among a four-wheel drive mode in which drive power is transmitted to front wheels and rear wheels, a two-wheel drive mode in which drive power is transmitted to only the rear wheels, and a high-speed drive mode in which the front wheels are rotated at a faster ground speed than the rear wheels;
a steering angle detection unit that detects an over-steering angle at which a steering angle of the front wheels formed as steering wheels is greater than or equal to a predetermined value;
a target revs detection unit that detects a target number of revolutions of an engine of the work vehicle;
a request determination unit that outputs an increase request when an actual number of revolutions of the engine is greater than the target number of revolutions by a predetermined value or more, the request determination unit outputting a special increase request that overrides the increase request when the over-steering angle is detected and even when the actual number of revolutions of the engine is greater than or equal to the predetermined value; and
a drive mode control unit that outputs a drive mode switching request to the drive mode switching mechanism,
wherein the drive mode control unit outputs the drive mode switching request for switching to the four-wheel drive mode, in response to output of the increase request;
wherein the drive mode control unit outputs the drive mode switching request for switching to the high-speed drive mode, in response to output of the special increase request; and
wherein the power transmission device remains in the four-wheel drive mode and the drive mode switching mechanism initiates the high-speed drive mode in response to output of both the increase request and the special increase request.

11. A drive control system for a work vehicle, comprising:
a power transmission device having a drive mode switching mechanism that performs drive mode switching among a four-wheel drive mode in which drive power is transmitted to front wheels and rear wheels, a two-wheel drive mode in which drive power is transmitted to only the rear wheels, and a high-speed drive mode in which the front wheels are rotated at a faster ground speed than the rear wheels;
a steering angle detection unit that detects an over-steering angle at which a steering angle of the front wheels formed as steering wheels is greater than or equal to a predetermined value;
a start detection unit that detects that the work vehicle has started traveling;
a request determination unit that outputs an increase request during a predetermined period of time after detection by the start detection unit that the work vehicle has started traveling, the request determination unit outputting a special increase request that overrides the increase request when the over-steering angle is detected and even during the predetermined period of time after the detection by the start detection unit that the work vehicle has started traveling; and a drive mode control unit that outputs a drive mode switching request to the drive mode switching mechanism, wherein the drive mode control unit outputs the drive mode switching request for switching to the four-wheel drive mode, in response to output of the increase request;

wherein the drive mode control unit outputs the drive mode switching request for switching to the high-speed drive mode, in response to output of the special increase request; and wherein the power transmission device remains in the four-wheel drive mode and the drive mode switching mechanism initiates the high-speed drive mode in response to output of both the increase request and the special increase request.

* * * * *

UNITED STATES PATENT AND TRADEMARK OFFICE
CERTIFICATE OF CORRECTION

PATENT NO. : 9,694,679 B2  
APPLICATION NO. : 14/796262  
DATED : July 4, 2017  
INVENTOR(S) : Akihiro Matsuzaki et al.

Page 1 of 1

It is certified that error appears in the above-identified patent and that said Letters Patent is hereby corrected as shown below:

Column 22, Line 31, Claim 3, delete "traveling travelling" and insert -- traveling --

Column 22, Line 43, Claim 5, delete "traveling travelling" and insert -- traveling --

Column 22, Line 55, Claim 7, delete "traveling travelling" and insert -- traveling --

Column 23, Line 32, Claim 8, delete "traveling travelling" and insert -- traveling --

Signed and Sealed this
Seventeenth Day of October, 2017

Joseph Matal
*Performing the Functions and Duties of the
Under Secretary of Commerce for Intellectual Property and
Director of the United States Patent and Trademark Office*